US006965075B2

(12) United States Patent
Suzuki

(10) Patent No.: US 6,965,075 B2
(45) Date of Patent: Nov. 15, 2005

(54) FRAME FOR ELECTRICAL AND ELECTRONIC EQUIPMENT HOUSING CABINETS AND A FRAME JOINING STRUCTURE

(75) Inventor: Kazumasa Suzuki, Aichi-ken (JP)

(73) Assignee: Nitto Electric Works, Ltd., Aichi-gun (JP)

( * ) Notice: Subject to any disclaimer, the term of this patent is extended or adjusted under 35 U.S.C. 154(b) by 397 days.

(21) Appl. No.: 10/080,625

(22) Filed: Feb. 21, 2002

(65) Prior Publication Data

US 2002/0121387 A1 Sep. 5, 2002

(30) Foreign Application Priority Data

Mar. 1, 2001 (JP) ....................................... 2001-056468
Mar. 19, 2001 (JP) ....................................... 2001-078067
Apr. 20, 2001 (JP) ....................................... 2001-122942
Sep. 6, 2001 (JP) ....................................... 2001-270472

(51) Int. Cl.[7] .................................................. H02G 3/08

(52) U.S. Cl. ........................ 174/50; 174/52.1; 403/217; 403/270; 403/219; 403/205; 403/169; 403/174; 361/600; 361/601; 361/641; 361/613; 361/638; 361/724; 361/728; 361/730; 361/796; 361/752

(58) Field of Search .................. 174/50, 52.1; 361/600, 361/641, 601, 613, 638, 724, 728, 730, 796, 752; 403/217, 270, 219, 205, 169, 174

(56) References Cited

U.S. PATENT DOCUMENTS 4,078,847 A * 3/1978 Presnick ..................... 312/140
4,473,315 A * 9/1984 Latchinian .................. 403/172
4,684,282 A * 8/1987 Lever ......................... 403/219
5,066,161 A * 11/1991 Pinney ....................... 403/172
5,901,033 A * 5/1999 Crawford et al. ........... 361/600

* cited by examiner

*Primary Examiner*—Dean A. Reichard
*Assistant Examiner*—Anton B Harris
(74) *Attorney, Agent, or Firm*—Frishauf, Holtz, Goodman & Chick, P.C.

(57) ABSTRACT

A frame joining structure for electrical and electronic equipment housing cabinets, in which ends of frames are simplified in shape to dispense with complex cutting and which possesses excellent strength and waterproof property. Ends of outer side surfaces (4) of three mutually orthogonal frames **(1*a*, 1*b*, 1*c*), which constitute a framework of a cabinet, are cut at two planes of ±45° relative to a plane defined by other two frames to be point-shaped. These ends are joined together directly or through a corner member (20)** having the same configuration as that of the ends to constitute a firm corner portion.

2 Claims, 44 Drawing Sheets

A (a)

(b)

(c)

(d)

FRAME FOR ELECTRICAL AND ELECTRONIC EQUIPMENT HOUSING CABINETS AND A FRAME JOINING STRUCTURE

BACKGROUND OF THE INVENTION

1. Field of the Invention

The invention relates to a frame for electrical and electronic equipment housing cabinets, in which a rectangular framework of an electrical and electronic equipment housing cabinet is constituted by combining frames in vertical, widthwise and depthwise directions, and a frame joining structure.

2. Prior Art

With electrical and electronic equipment housing cabinets such as control panel boxes, communication panel boxes, high voltage power receiving boxes, it is common that twelve hollow frames being quadrilateral in cross sectional shape are combined to constitute a rectangular framework. Ends of the respective frames are cut at 90° relative to their lengthwise directions, and joined together by inserting a corner member having mutually orthogonal three arms into the ends of the respective frames or making use of a connection member.

Cabinet outer walls such as side plates, a door and the like are mounted around the frames, and equipment mount-holes formed in the frames are made use of to mount equipment mount rails and internal equipments. For such frame for electrical and electronic equipment housing cabinets, it has been used conventionally that made of hollow frames being square or triangular in cross sectional shape and open frames formed by bending a steel sheet.

Among such hollow frames, at least vertical frames standing at four corners of a cabinet are such that L-shaped or flat plate-shaped draining sides are projectingly extended from a hollow frame body to abut against packings for panels, a door or the like, which constitutes outer walls, thus forming a waterproof seal.

The prior art involves the following problems:

(1) Among these conventional structures, one with respective frames of simple square-shaped cross section involves no special problem. However, since recessed portions and waterproof sides are frequently provided on respective frames in view of strength and waterproofness, there has been caused a problem that frame ends are cut in a complex manner and corner members conformed to a configuration of the frame ends are needed.

(2) Hollow frames have an advantage in easiness of ensuring strength. However, in the case where equipment mount holes are formed on the hollow frames, there has been involved a disadvantage in the necessity of using special nuts and mounting of equipments with a special structure because frame interiors are not accessible. On the other hand, open frames without hollow portions make it possible to easily mount equipments without the use of special nuts or the like, but there has been caused a problem that an adequate strength cannot be obtained.

(3) Among conventional vertical frames, one provided with, for example, L-shaped sides involves a problem in the need of large contact forces for sure close contact over an entire surface because a bent surface of the frame abuts against a packing to be large in contact area.

(4) Meanwhile, a frame provided with flat plate-shaped draining sides provides sure sealing with small contact forces, which are required to contact a packing at a small area of a tip end thereof, but there has been caused a problem in a difficulty to ensure water holding portions (water flow passages in a vertical frame). Also, in the case of combining cabinets together, connection plates are screwed between both frames of the respective cabinets. However, such structure impedes enhancement in strength from the viewpoint of earthquake performance since load of the respective frames is imposed only on screws.

(5) Conventionally, frame joining structures therefor have been known, in which cast-metal corner pieces provided with projections in three directions are used and frame ends are fitted onto the respective projections to be screwed, or frame ends are complexly cut in a manner to combine with one another in a three-dimensional manner and are directly welded to one another.

(6) However, there has been caused a problem that with a frame joining structure with all frame ends screwed and joined to the corner pieces, it is difficult to obtain adequate strength and rigidity. Meawhile, with that frame joining structure, in which all frame ends are welded together, it is possible to obtain adequate strength and rigidity, but there has been caused a problem that treatment with a sander is needed to worsen workability, which requires much labor and work time to lead to an increase in cost. In particular, frames for electrical and electronic equipment housing cabinets are frequently made considerably complex in cross sectional shape, so that there is the possibility that portions, to which a sander for treatment after welding is hard to get access, are produced on frame surfaces to make an outward appearance unsightly.

SUMMARY OF THE INVENTION

Subjects to be Solved

The subjects of the invention reside in the following points for solving the above-mentioned problems.

(A) To simplify an end configuration of a frame to dispense with complex cutting and to provide a frame joining structure for electrical and electronic equipment housing cabinets, capable of getting an excellent strength and waterproof property.

(B) To provide a frame for electrical and electronic equipment housing cabinets, which can ensure strength and makes mounting of equipments easy.

(C) To provide a vertical frame body for electrical and electronic equipment housing cabinets, which can effect a sure waterproof sealing with forces of a small magnitude and in which water flow channels can be ensured, the frame having enhanced strength in connection and mounting of the outer walls.

(D) To provide a frame joining structure for electrical and electronic equipment housing cabinets, by which adequate strength and rigidity can be obtained and which can contemplate shortening of time for assembling work, cost reduction, improvement in outward appearance and the like.

Means for Solving the Subject (1) For the First Subject (A)

Ends of outer side surfaces of three mutually orthogonal frames, which constitute a framework of an electrical and electronic equipment housing cabinet, are shaped to be cut at two planes of ±45° relative to a plane defined by other two frames, and these ends are joined together to constitute a corner portion.

A corner member can be provided in the corner portion to be covered by the ends of the outer side surfaces of the three frames. Also, the ends of the outer side surfaces of the three frames are shaped to be defined by a corner member in the form of an outwardly exposed tetrahedron. In either case, the structure can be made such that obliquely extending draining portions are provided on both sides of the outer side surfaces of the three frames, and the draining portions are joined together at the corner portion.

According to the invention, the ends of the respective frames can be shaped in the same manner, so that work is easy and dispersion in strength can be removed from front and rear, upper and lower, and right and left portions. Also, in the case of providing draining portions on the respective frames, an excellent waterproof property can be ensured by joining ends thereof together.

(2) For the Second Subject (B)

A frame is bar-shaped and comprises a hollow portion or portions and orthogonal, plate-shaped equipment mount sides connected to the hollow portion or portions. In addition, the plate-shaped equipment mount sides are preferably extended from a corner portion of a hollow portion inside the cabinet. Also, it is preferable that the hollow portion is triangular in cross section, and draining portions are provided on both outer wall sides of a cabinet to abut obliquely against the outer wall sides of the cabinet. Also, the plate-shaped equipment mount sides can be formed with equipment mount holes, inside of which is circular and outside of which is quadrilateral. Further, a formed side is provided to be contiguous to a draining portion and in parallel to the cabinet outer wall.

Since the frame for electrical and electronic equipment housing cabinets, according to the invention comprises a hollow portion or portions and orthogonal, plate-shaped equipment mount sides connected to the hollow portion or portions, adequate strength can be ensured by the hollow portion or portions. Also, since the frame is provided with the orthogonal, plate-shaped equipment mount sides, equipments can be easily mounted in two directions even when special nuts or the like are not used.

(3) For the Third Subject (C)

In a vertical frame for supporting outer walls of a cabinet, a frame body is provided with draining sides, which abut obliquely against the outer walls, and formed sides disposed further inward than the draining sides and in parallel to the outer walls. Also, the draining sides may be provided on the right and the left, and an oblique side may be provided therebetween to distend outward.

A vertical frame body is provided with draining sides, which abut obliquely against the outer walls, oblique abutting makes contact pressure small to enable ensuring water holding portions and effecting a sure waterproof sealing with forces of a small magnitude, and formed sides in parallel to the outer walls are provided to enhance strength in connection and mounting of the outer walls.

(4) For the Fourth Subject (D)

Ends of frames are joined together at a corner portion of a cabinet by means of welding and fasteners. In addition, at least a part of a frame inner side portion of the frame further inwardly of the cabinet than portions abutting against a door, side panels, a roof or the like is joined by welding, and at least a part of a frame outer side portion of the frame further outwardly of the cabinet than the abutting portions is joined by fasteners. On the contrary, at least a part of a frame inner side portion of the frame further inwardly of the cabinet than portions abutting against a door, side panels, a roof or the like can be joined by fasteners and at least a part of a frame outer side portion of the frame further outwardly of the cabinet than the abutting portions can be joined by welding.

Also, the frames comprise a hollow portion or portions and a recessed portion, and the recessed portion is secured by a rivet or rivets, which are one kind of fasteners. In this case, the recessed portions can be formed in a frame inner side portion and a frame outer side portion, respectively, or the recessed portion formed on the frame outer side portion can be made a draining portion and secured at a bottom portion thereof by a rivet or rivets and welded at side walls thereof.

Cost reduction and improvement in outward appearance can be contemplated by using welding to ensure strength and rigidity, and using rivets or the like for portions, on which treatment with a sander is hard to be performed and which are unfavorable in workability, to reduce locations where welding is required.

DESCRIPTION OF THE PREFERRED EMBODIMENTS

With reference to the drawings, preferred embodiments will be described to present respective solving means (1) to (4) for respective subjects (A) to (D) of the invention.

(1) Re: Embodiment Form (A) of the Invention

Figure 1:
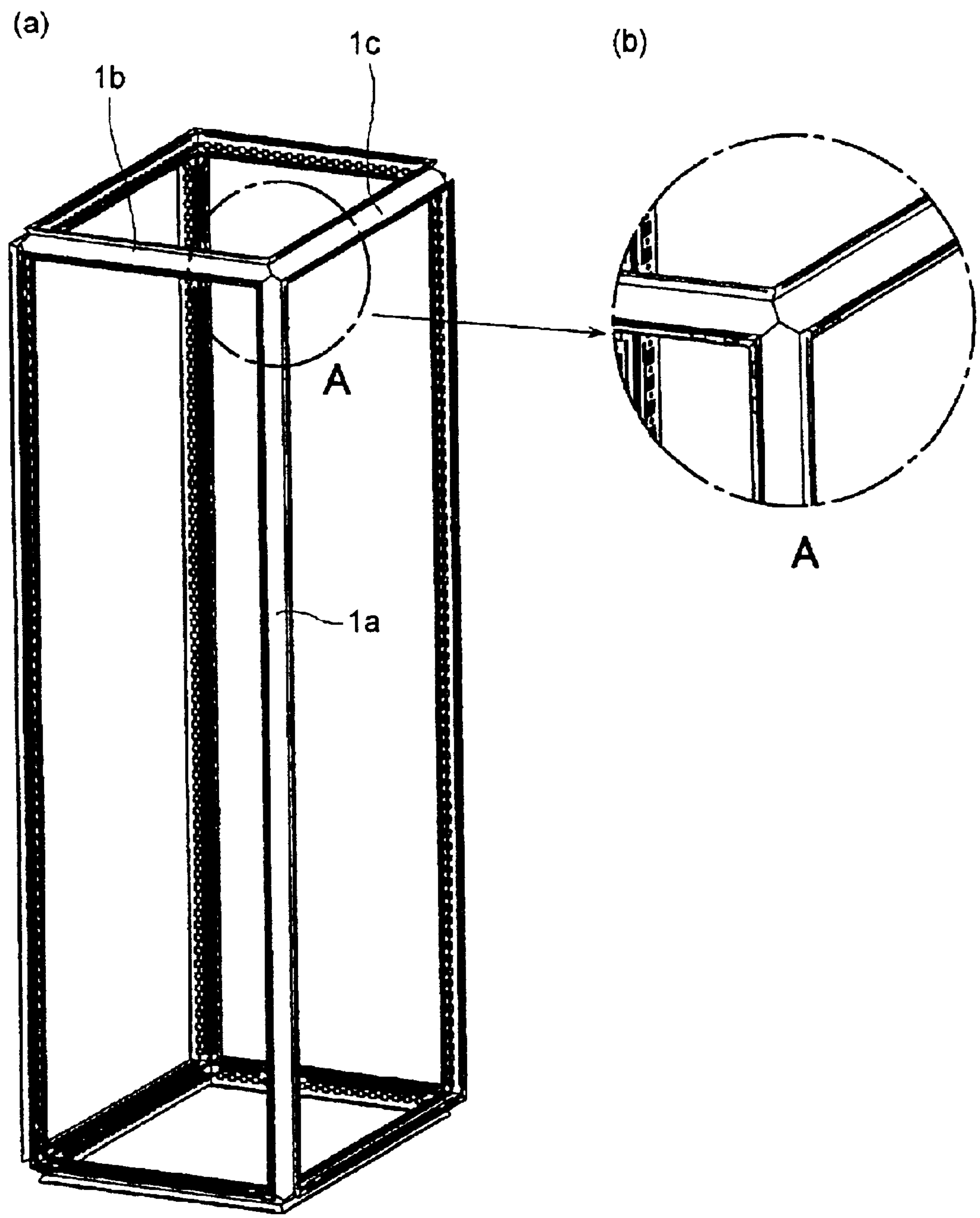
FIG. 1(*a*) is a general perspective view showing an electrical and electronic equipment housing cabinet having a frame joining structure of the invention, FIG. 1(*b*) being a partially enlarged view.
Figure 2:
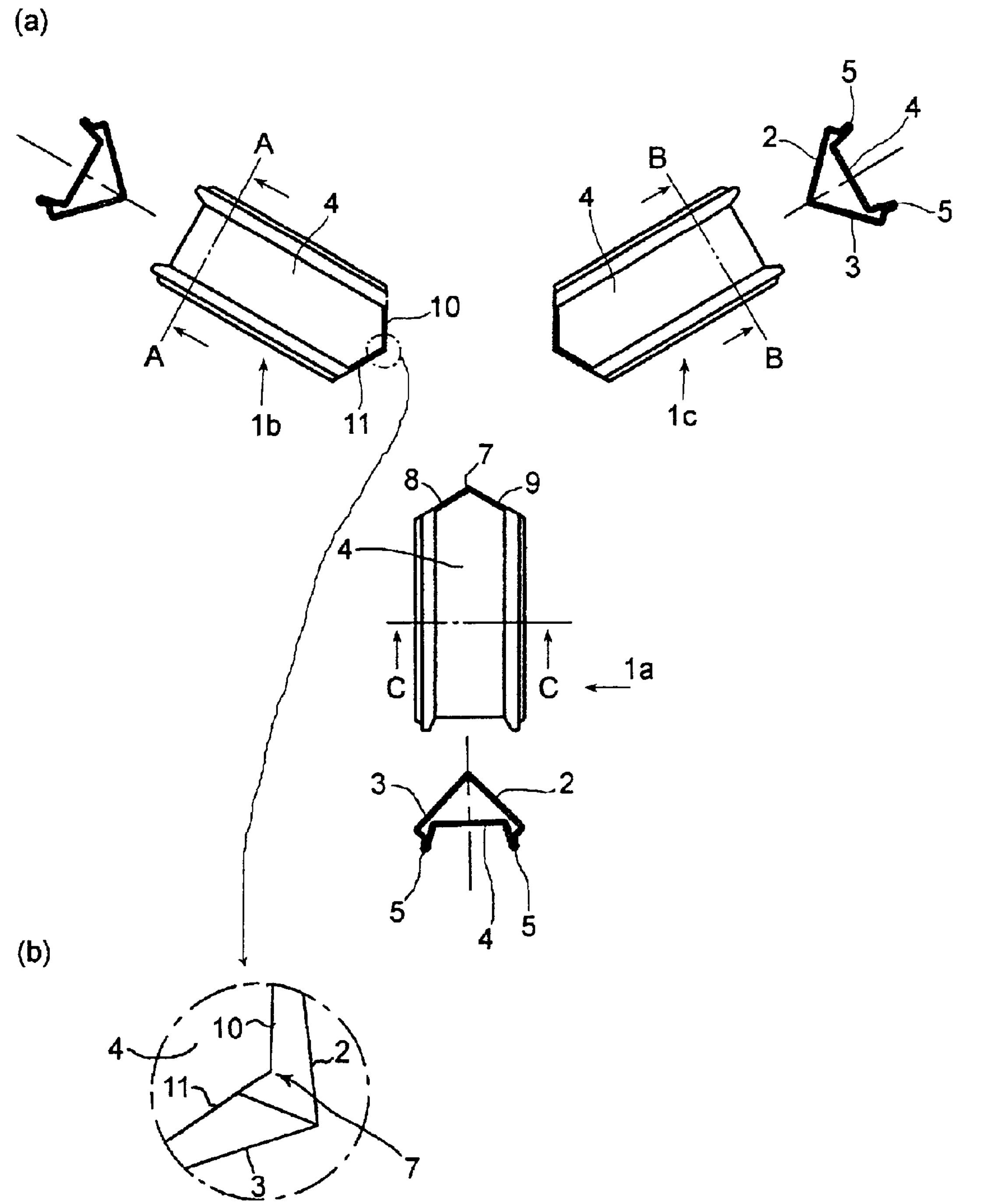
FIG. 2(*a*) is an exploded, perspective view showing an embodiment form of the invention of claim 1, FIG. 2(*b*) being a partially enlarged view with a view point changed.

FIG. 1 is a general view showing an electrical and electronic equipment housing cabinet having a frame joining structure of the invention, and FIG. 2 is an exploded, perspective view showing an embodiment of the invention As shown in FIG. 1, a hexahedron-shaped framework of the electrical and electronic equipment housing cabinet is composed of twelve frames . Respective corners are composed of three orthogonal frames (vertical frame 1*a*, width frame 1*b*, depth frame 1*c*). In this embodiment form, the three frames have the same cross-sectional shape.

As shown in FIG. 2, the respective frames 1 have two right-angled faces 2, 3, and an oblique outward face 4. The two right-angled faces 2, 3 face an inner side of the cabinet, and have equipment mount holes in the same manner as in the prior art. Also, the outward face 4 is provided at both upper and lower sides thereof with obliquely extending draining portions 5, 5. The frame 1 has such cross-sectional shape to extend lengthwise.

Figure 3:
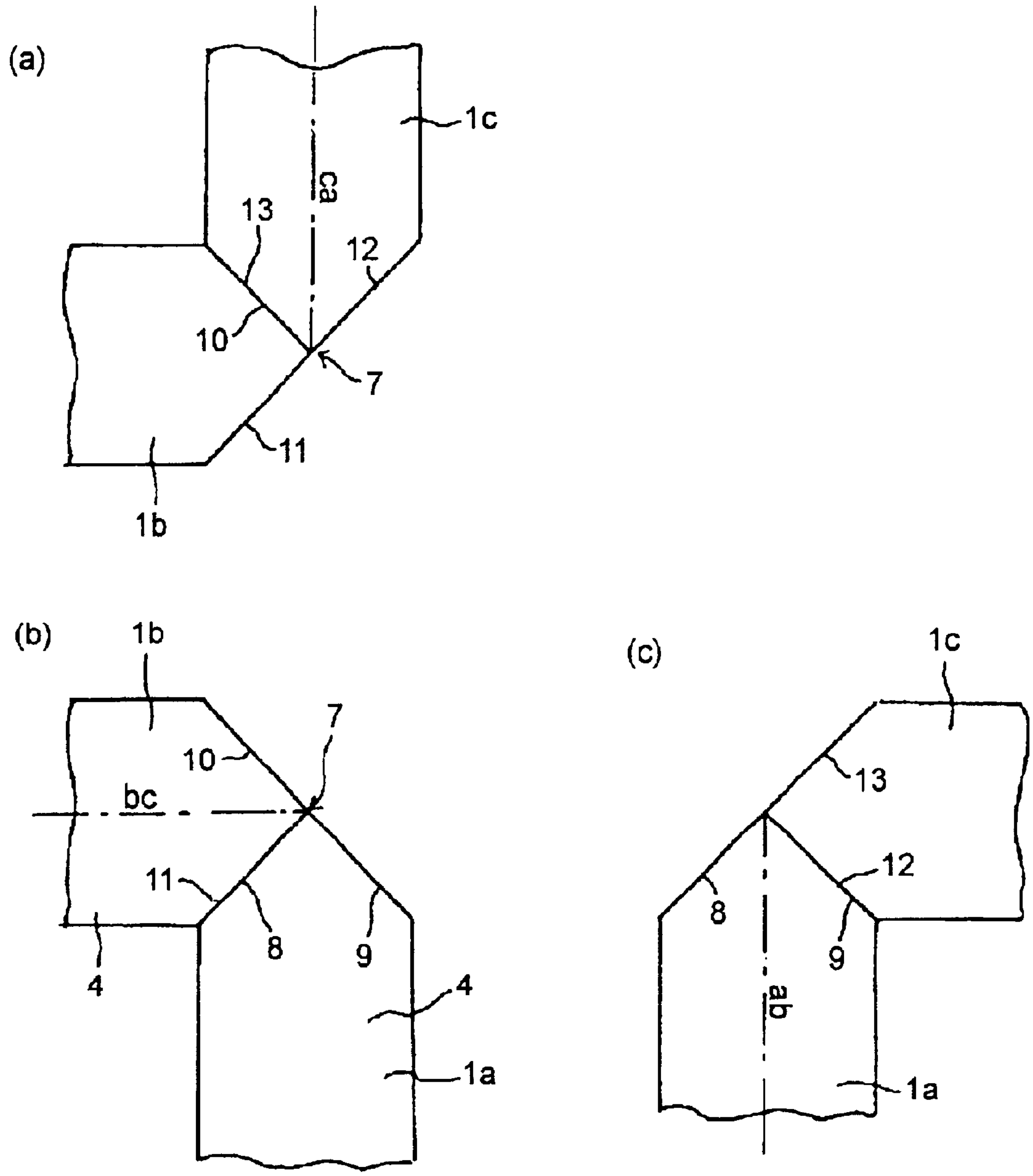
FIG. 3 is a three sided view, from which draining portions are omitted for elucidation of cutting directions and an assembled condition, (*a*) being a plan view, (*b*) being a front view, and (*c*) being a right-side view.

However, ends of the outward face 4 of the respective frames 1 are shaped to be cut at two oblique extending surfaces. FIG. 3 is a three sided view, from which the draining portions 5, 5 are omitted for the better understanding of cutting directions at the ends and an assembled condition.

For example, an upper end of the outward face 4 of the vertical frame 1*a* is sharp-pointed to be cut at two planes of ±45° relative to a plane bc (horizontal plane) defined by other two frames 1*b*, 1*c*, which are orthogonal to the frame 1*a* and have ends 8, 9 on both sides of a central apex 7.

Likewise, ends of the outward face 4 of the width frame 1*b* are sharp-pointed to be cut at two planes of ±45° relative to a plane ca (vertical plane in a depthwise direction) defined by other two frames 1*c*, 1*a*, and have ends 10, 11 on both sides of a central apex 7.

As shown in FIG. 3, the ends 10, 11 on the both sides of the central apex 7 extended from the outward face 4 hide the two right-angled faces 2, 3 disposed backward thereof. This state is the same in the perspective view of FIG. 2, in which edges of the faces 2, 3 overlap the central apex 7 and the ends 10, 11 on the both sides thereof and so are not well visible. Hereupon, FIG. 2(*b*) is a view, in which a partial view point for the central apex 7 on the frame 1*b* is modified and partially magnified. It will be understood in the view of modification of view point and partial magnification that a substantially triangular-shaped hollow portion is present between the edges of the faces 2, 3 and the central apex 7.

Further, ends of the outward face 4 of the depth frame 1*c* are similarly sharp-pointed to be cut at two planes of ±45° relative to a plane ab (vertical plane in a widthwise direction) defined by other two frames 1*a*, 1*b*, and have ends 12, 13 on both sides of a central apex 7.

In other words, cutting at the corners of the respective frames is such that the corners are cut in planes at 45° relative to both the vertical frames 1*a* and the width frames 1*b* so that ends of the vertical frames 1*a* and ends of the width frames 1*b* correspond with each other to form picture-frame shaped (band-shaped quadrilateral) frames, cut in planes at 45° relative to both the width frames 1*b* and the depth frames 1*c* so that ends of the width frames 1*b* and ends of the depth frames 1*c* correspond with each other to form picture-frame shaped (band-shaped quadrilateral) frames, and cut in planes at 45° relative to both the depth frames 1*c* and the vertical frames 1*a* so that ends of the depth frames 1*c* and ends of the vertical frames 1*a* correspond with each other to form picture-frame shaped (band-shaped quadrilateral) frames, the respective frames forming corner portions equaling with one another.

As a result of an oblique angle being 45°, in the assembled state as in FIG. 3, an end 8 of the vertical frame 1*a* and an end 11 of the width frame 1*b* are contiguous to and in accord with each other, an end 9 of the vertical frame 1*a* and an end 12 of the depth frame 1*c* are contiguous to and in accord with each other, and an end 10 of the width frame 1*b* and an end 13 of the depth frame 1*c* are contiguous to and in accord with each other. These ends are joined by welding or the like to form corners. In addition, the oblique angle 45° includes an error of and modification of several degrees in the tolerance.

As a natural result, the end 9 of the vertical frame 1*a* and the end 10 of the width frame 1*b* are flush with the outward face 4 of the depth frame 1*c*, the end 11 of the width frame 1*b* and the end 12 of the depth frame 1*c* are flush with the outward face 4 of the vertical frame 1*a*, and the end 8 of the vertical frame 1*a* and the end 13 of the depth frame 1*c* are flush with the outward face 4 of the width frame 1*b*.

In this manner, since the ends of the respective frames 1*a*, 1*b*, and 1*c* can be made identical in shape with one another, a frame structure can be made, which is easy to work and rigid and free of dispersion in front and rear, upper and lower, and right and left directions. Also, the draining portions 5 of the respective frames are simply joined with one another to enable ensuring the waterproof property. This will become apparent in the following embodiment forms.

Figure 4:
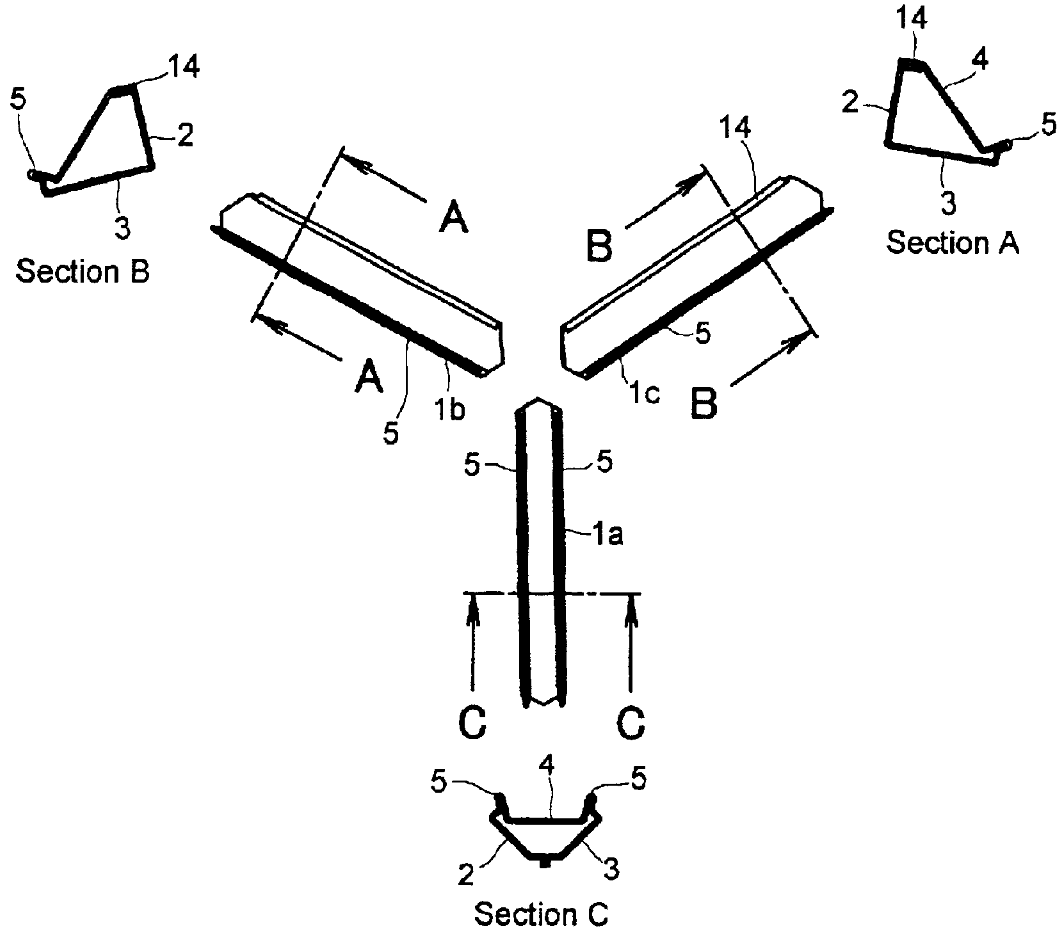
FIG. 4 is an exploded, perspective view showing another embodiment form of the invention of claim 1.

FIG. 4 is a perspective view showing an alternate embodiment of the present invention. In the embodiment, a vertical frame 1*a* is provided on both sides of an outward face 4 thereof with obliquely extending draining portions 5, 5 while a width frame 1*b* ard a depth frame 1*c* are provided only on a lower side of an outward face 4 with a draining portion 5 and on an upper side of the outward face 4 with a horizontal surface 14. with such structure, panels at a roof surface and a bottom surface of the cabinet are easy to install. However, the structure has the same configuration and joining Construction of ends is those shown in FIG. 2.

Figure 5:
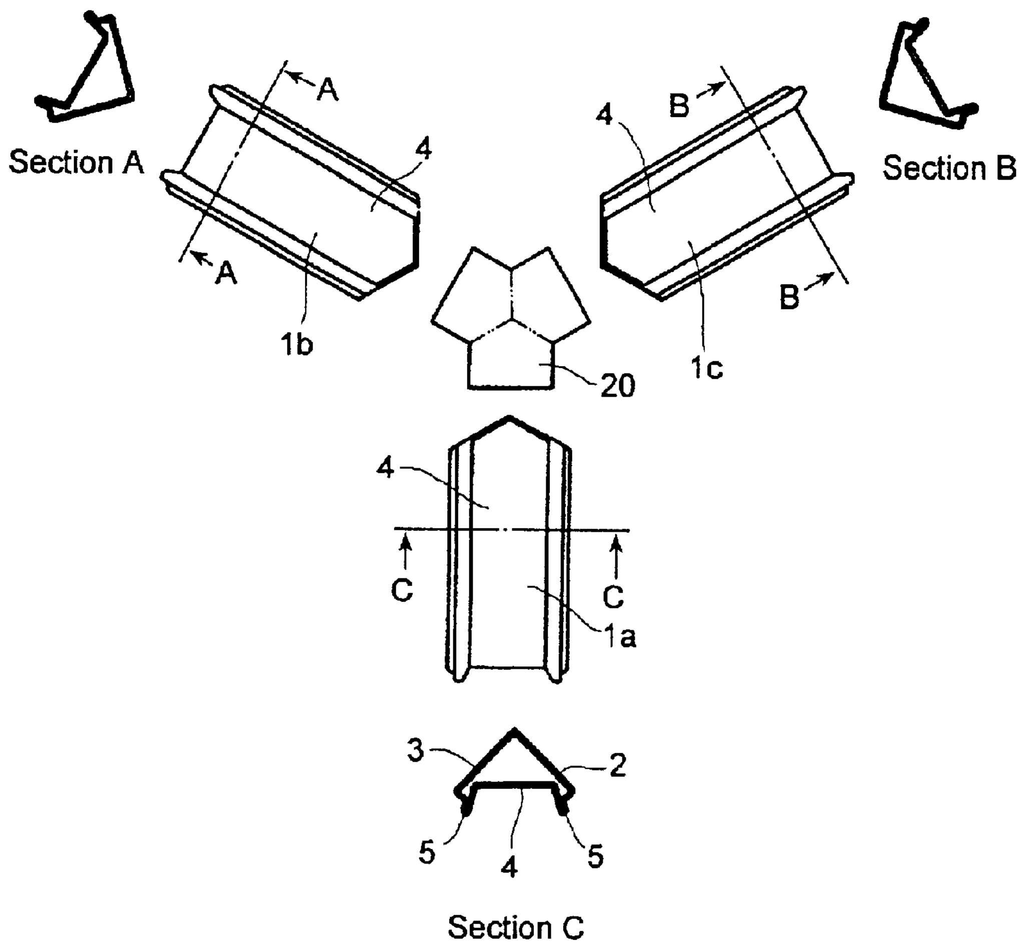
FIG. 5 is an exploded, perspective view showing an embodiment form of the invention of claim 2.
Figure 6:
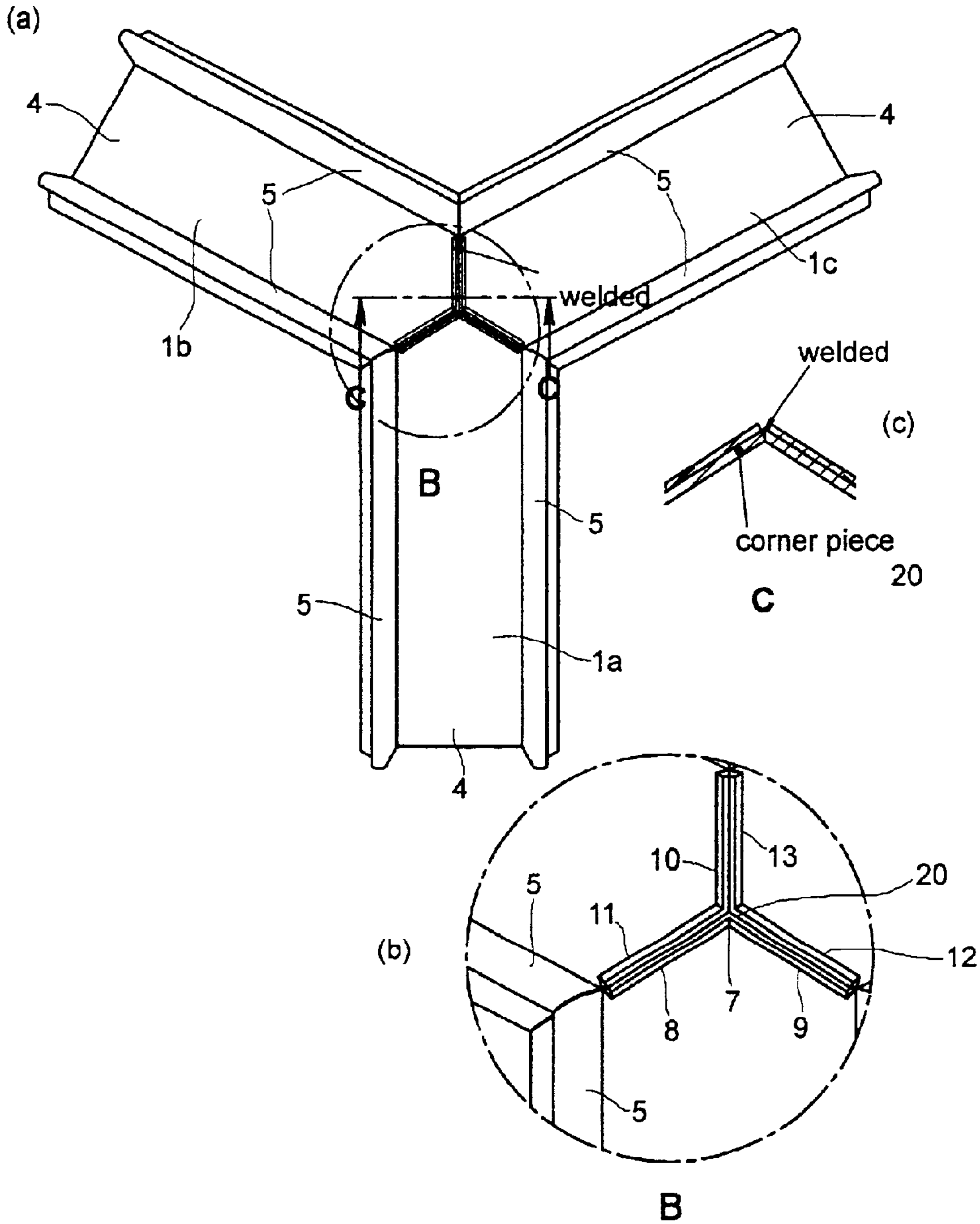
FIG. 6(*a*) is a perspective view showing an assembled state of the embodiment form of the invention of claim 2, FIG. 6(*b*) being a partially enlarged view, and FIG. 6(*c*) being a partial, cross sectional view.

As shown in FIGS 5 and 6, a corner member 20 shown centrally in FIG. 5 may be used as a corner. The corner member 20 has the same configuration as that constituted by the above three frames 1*a*, 1*b*, 1*c* and is embedded in a corner portion. Surfaces of the corner member are covered by ends of the outward faces 4 of the three frames 1*a*, 1*b*, 1*c*.

When the corner member 20 is used, only edge portions at the ends of the respective frames 1*a*, 1*b*, 1*c* suffice to be welded to the corner member 20, so that short weld distances serve, and the frame on both sides and the corner member 20 can be welded at a time to reinforce the corner portion, whereby the waterproof property and strength are both improved Also, even if some error is involved in cutting accuracy of the ends, it does riot matter because the corner member 20 is present inside. In addition, the draining portions 5 of the respective frames are joined at ends thereof to form continuous water passages.

Figure 7:
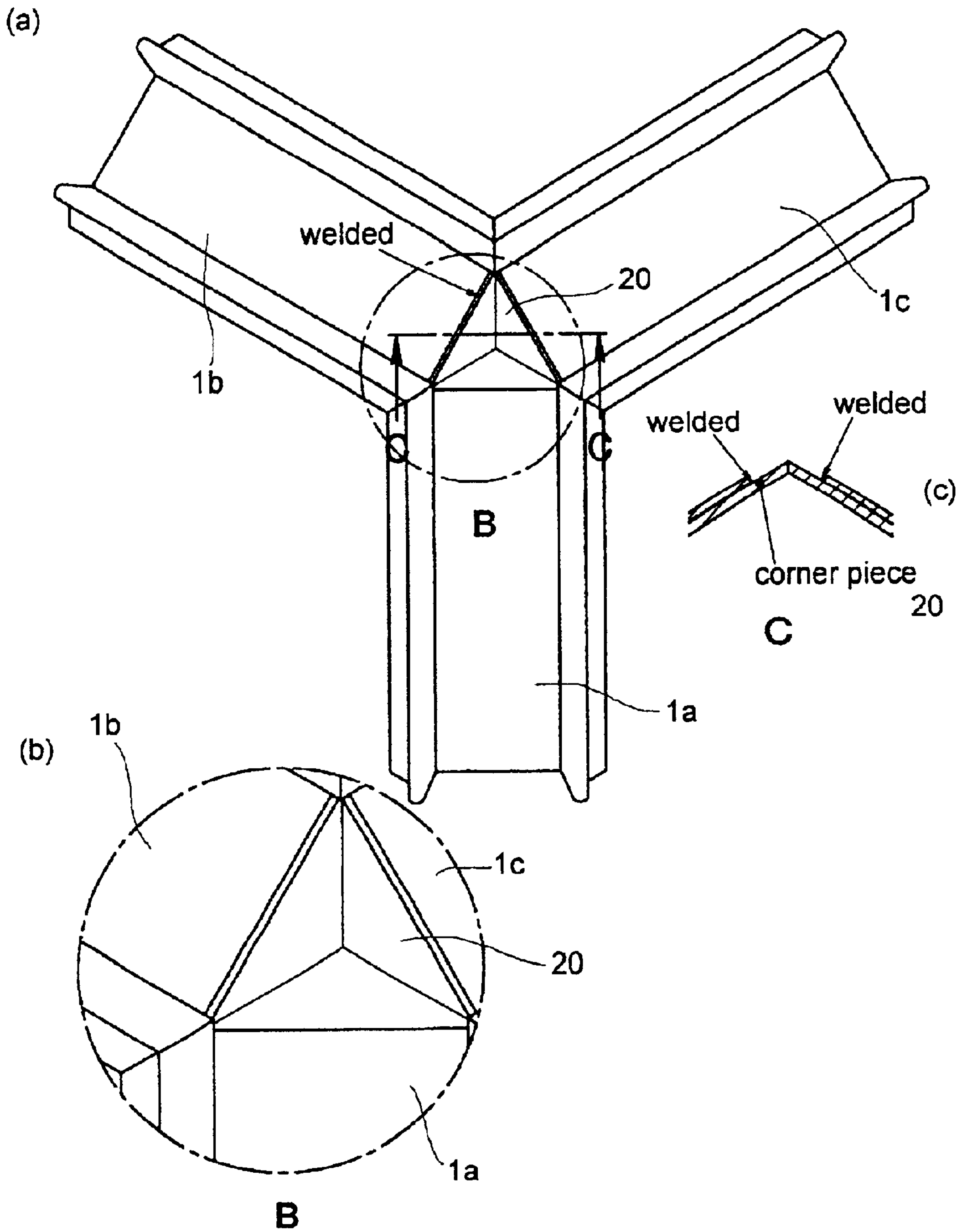
FIG. 7(*a*) is an exploded, perspective view showing an embodiment form of the invention of claim 3, FIG. 7(*b*) being a partially enlarged view, and FIG. 7(*c*) being a partial, cross sectional view.

In the embodiments described above, the ends of the outward face of the three frames 1*a*, 1*b*, 1*c* are directly joined to one another to form a corner portion. However, as shown in FIG. 7, after respective frames 1*a*, 1*b*, 1*c* are cut at two planes of ±45° as in the above embodiments, only ends of outward faces may be cut perpendicularly to a lengthwise direction, and so the corner member 20 may be centrally exposed. That is, a configuration of the ends of the above mentioned outward faces 4 is constituted by a trigonal pyramid shaped corner member 20 exposed to outside of the frame.

As shown in in FIG. 7 the central portion of the corner member 20 may be exposed, so that ends of the outward faces of the respective frames 1*a*, 1*b*, 1*c* are welded to the corner member 20 in a triangular fashion. In the invention, the corner portion is reinforced by the corner member 20 to be enhanced in both waterproof property and strength, which presents an advantage that strict cutting dimensions are not required. In addition, the above-mentioned oblique angle 45° includes an error of and modification of several degrees in the tolerance.

(2) Re: Embodiment Form (B) of the Invention

Figure 8:
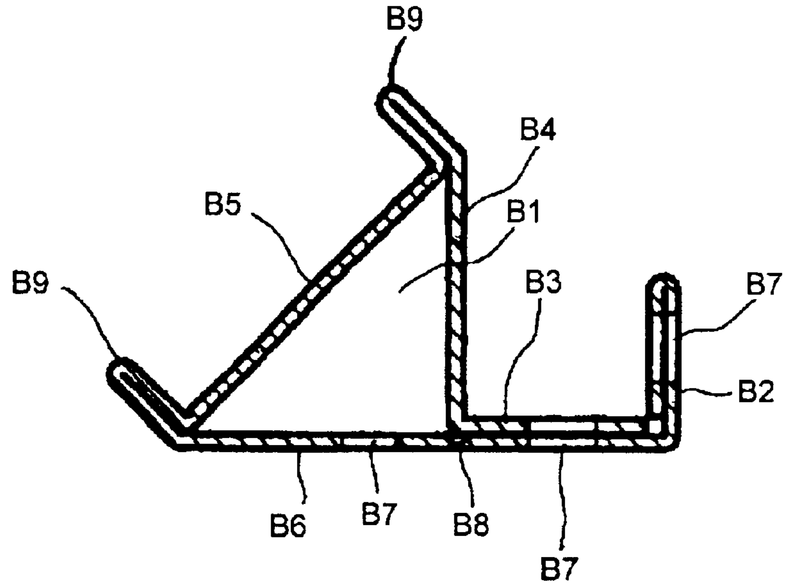
FIG. 8 is a cross sectional view showing a frame according to a first embodiment.

FIG. 8 is a cross sectional view showing a frame according to a first embodiment of the embodiment form. The frame is manufactured by folding and welding a metallic sheet, and comprises a hollow portion B1, and plate-shaped equipment mount sides B2, B3 connected to the hollow portion B1 to be perpendicular to each other. The hollow portion B1 may have any optional cross-sectional shape such as circular, and comprises three plate-shaped sides B4, B5 and B6 in the embodiment to be triangular-shaped. The plate-shaped equipment mount sides B2, B3, respectively, are formed with equipment mount holes B7 at predetermined pitch.

Figure 9:
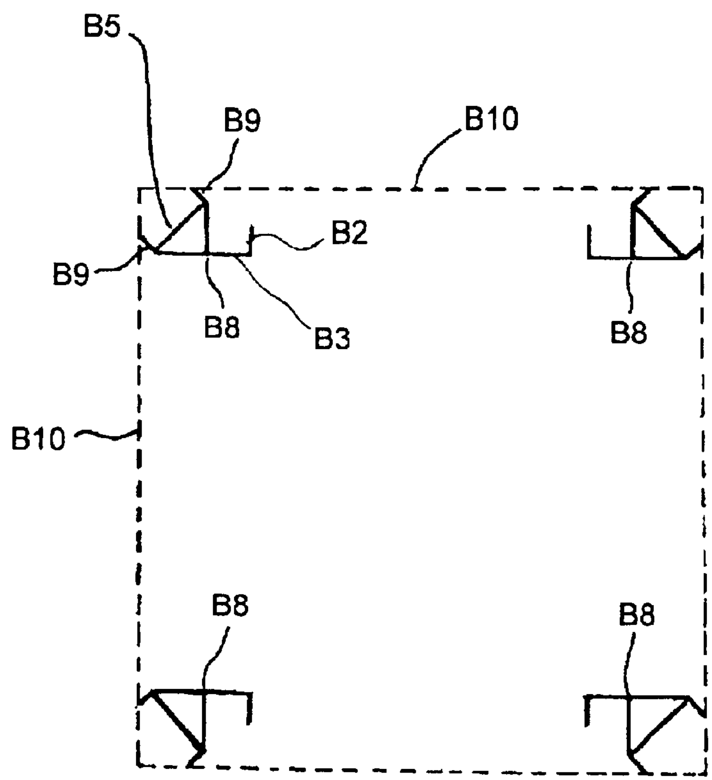
FIG. 9 is a horizontal cross sectional view showing a cabinet making use of the frame shown in FIG. 8.

As shown in FIG. 9, the frame is used such that right-angled portions of the hollow portions B1 define inside corner portions B8. Accordingly, the plate-shaped equipment mount side B3 is constructed to extend from the cabinet inside corner portion B8 of the hollow portion B1.

Also, projectingly formed on both sides of the hollow portion B1, which define cabinet outer wall sides, are draining portions B9, B9 to abut obliquely against a cabinet outer-wall B10.

The frame in FIG. 8 possesses the hollow portions B1 to be enhanced in strength and makes it possible to mount equipments thereto without the use of special bolts and nuts, since bolts can be inserted from openings on back sides of the equipment mount sides B2, B3. In addition, equipment mount holes B7 are provided in the plate-shaped side B6 on the hollow portion B1, so that it is possible to accomodate mounting of various internal equipments. Also, the equipment mount sides B2, B3 are made double-walled as shown in the figure whereby strength of the mount portions is excellent and spot welding can be made at the time of manufacture, which can attain easy manufacture and cost reduction.

Figure 10:
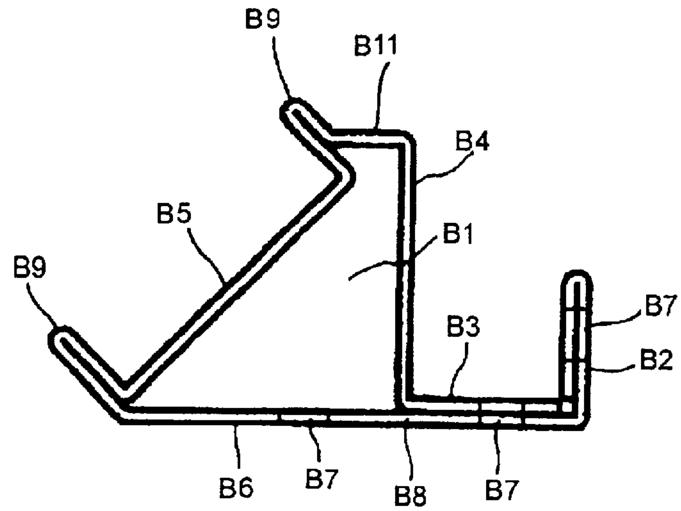
FIG. 10 is a cross sectional view showing a frame according to a second embodiment.

In a second embodiment shown in FIG. 10, the first embodiment is modified such that a formed side B11 is provided to be contiguous to one of the draining portions B9 and parallel to the cabinet outer wall. The formed sides B11 are disposed on the sides of the cabinet to enable a cabinet, in which sides are easy to connect and front and back are wide.

Figure 11:
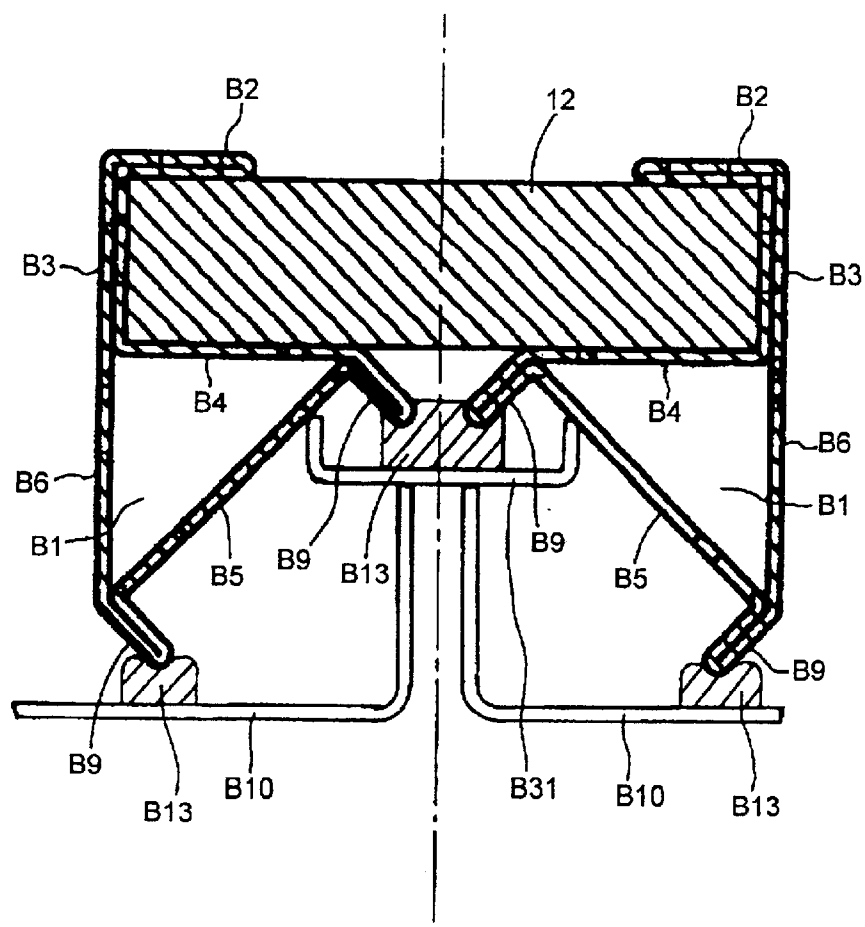
FIG. 11 is a horizontal cross sectional view showing a state, in which cabinets making use of the frame shown in FIG. 10 are connected together.

FIG. 11 is a horizontal, cross sectional view showing a state, in which cabinets making use of the frames according to the first embodiment are connected to each other. Connection metal fittings B12 are received in openings defined by the equipment mount sides B2, B3 of the both frames to be surface-supported, which enables rigid securement and prevents the metal fittings from extending inside the cabinets. In addition to such manner of mounting, the connection metal fittings B12 can be mounted outside the openings defined by the equipment mount sides B2, B3. In addition, the reference numeral B13 denotes a packing and B31 a packing support member.

Figure 12:
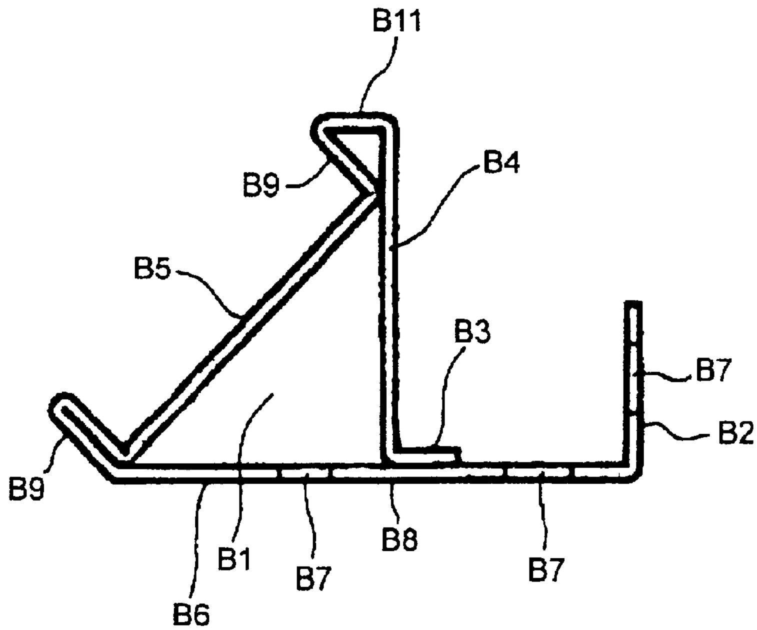
FIG. 12 is a cross sectional view showing a frame according to a third embodiment.

In a third embodiment shown in FIG. 12, the first embodiment is modified such that a formed side B11 is provided to be contiguous to a tip end of one of the draining portions B9 and parallel to the cabinet outer wall, and the mutually perpendicular equipment mount sides B2, B3 are made single-walled. With the double-walled equipment mount sides B2, B3 shown in FIGS. 8 and 10, the equipment mount holes B7 are formed in a sheet material and then roll forming is performed, which requires high work accuracy to make the overlapping equipment mount holes B7, B7 in accord with each other, but any high work accuracy is not needed in the third embodiment shown in FIG. 12.

Also, the draining portions B9 and the formed side B1 define a plurality of hollow portions, such as large and small triangular-shaped ones, in the frame. The frame thus formed with the plurality of hollow portions can be enhanced in strength. In addition, with the embodiment, the respective hollow portions are closed while the above-mentioned effect is attained with hollow portions, which are slightly opened to be substantially hollow.

Figure 13:
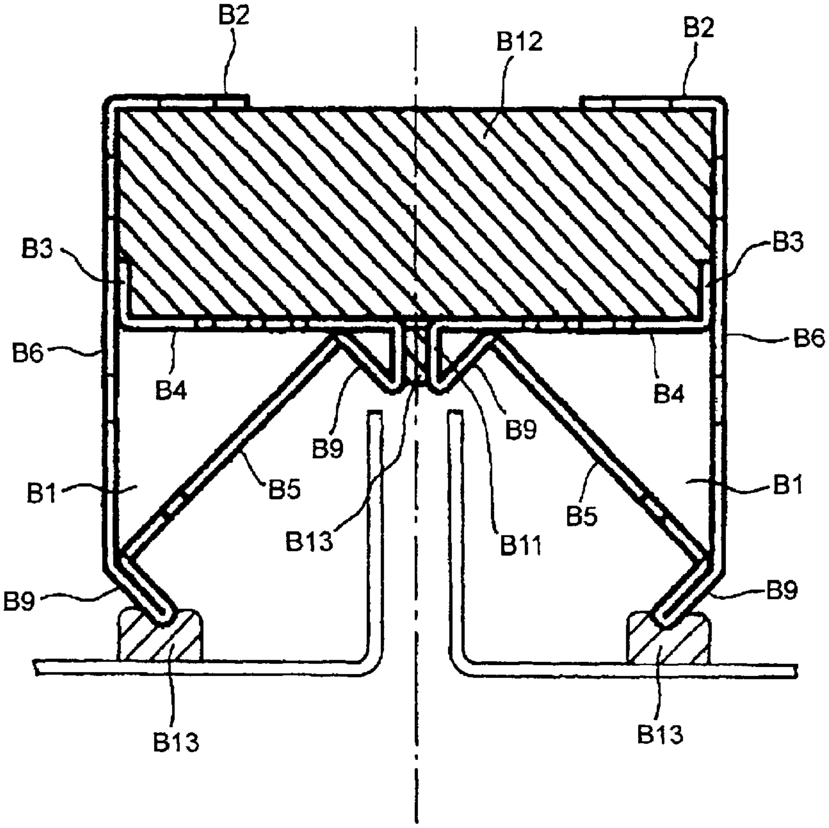
FIG. 13 is a horizontal cross sectional view showing a state, in which cabinets making use of the frame shown in FIG. 12 are connected together.

FIG. 13 is a horizontal, cross sectional view showing a state, in which cabinets making use of the frames according to the third embodiment are connected to each other. With the embodiment, it suffices that central packings B13 are provided to abut against the formed sides B11, and so there is no need of any packing support member, which makes treatment of packings simple and connection of cabinets easy. In addition, the connection metal fittings B12 are provided in the same manner as in FIG. 4.

Referring now to FIGS. 14 to 20, an explanation will be given to connection of cabinets and mounting of base metal fittings, in which the frames according to the first embodiment shown in FIG. 8 are used for vertical frames, lateral frames and depth frames.

Figure 14:
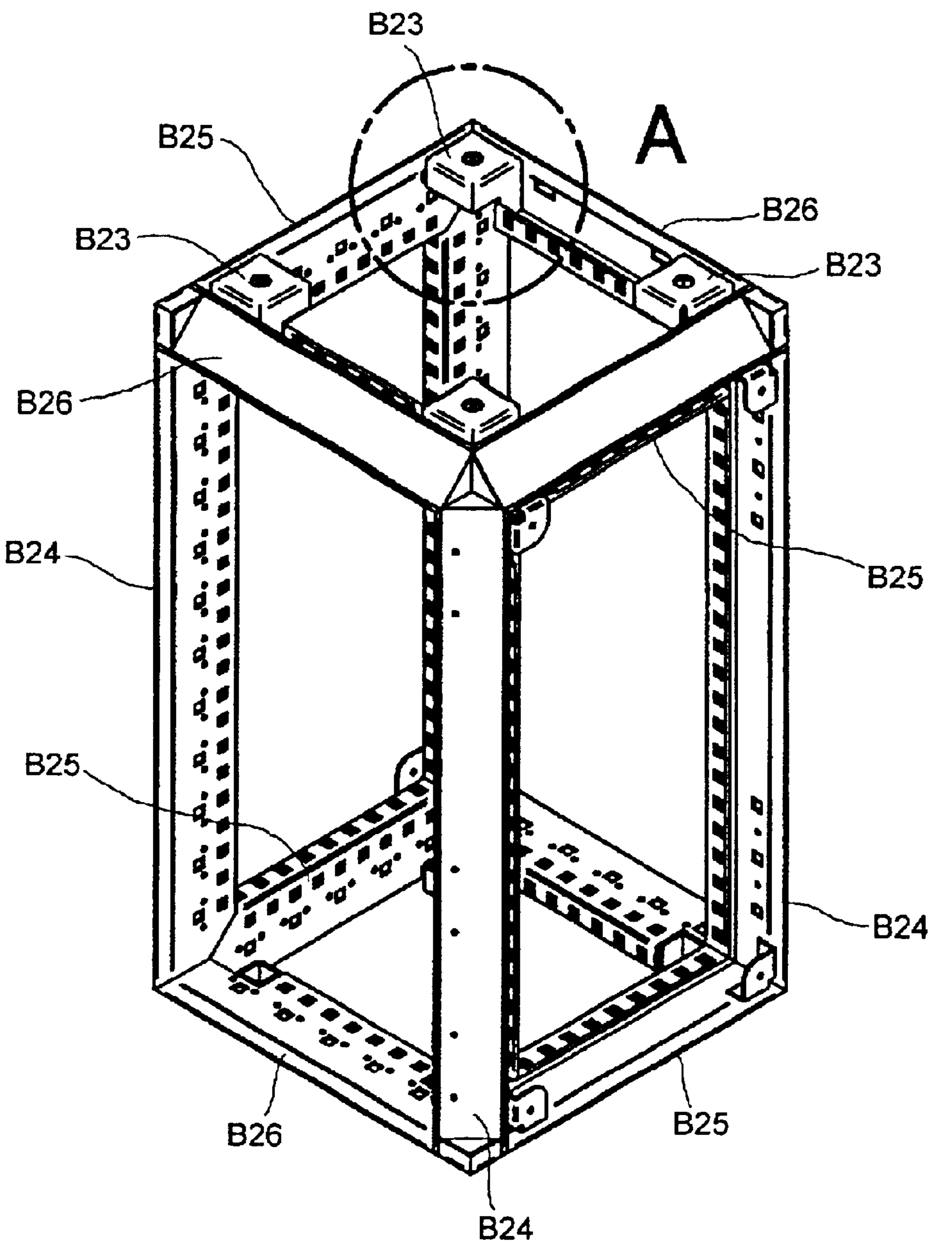
FIG. 14 is a perspective view showing a framework of a cabinet, to which base metal fittings are mounted.
Figure 15:
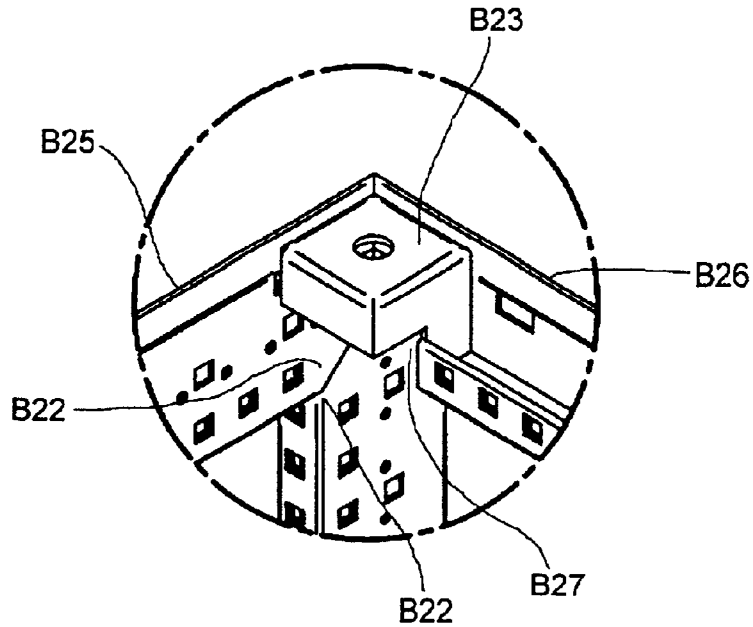
FIG. 15 is an enlarged view showing an essential part of FIG. 14.

FIG. 14 is a perspective view showing a framework of a cabinet, to which base metal fittings B23 are mounted, FIG. 15 being an enlarged view showing an essential part of the framework. Generally, an outdoor cabinet of this type is provided at corners thereof with base metal fittings B23 and fixed at a location of installation by means of bolts (not shown). Such base metal fittings B23 is fixed at a bottom plate side in locations of installation by means of bolts (not shown) and mounts at an upper plate side bolts (not shown) with suspending metal fittings.

Figure 16:
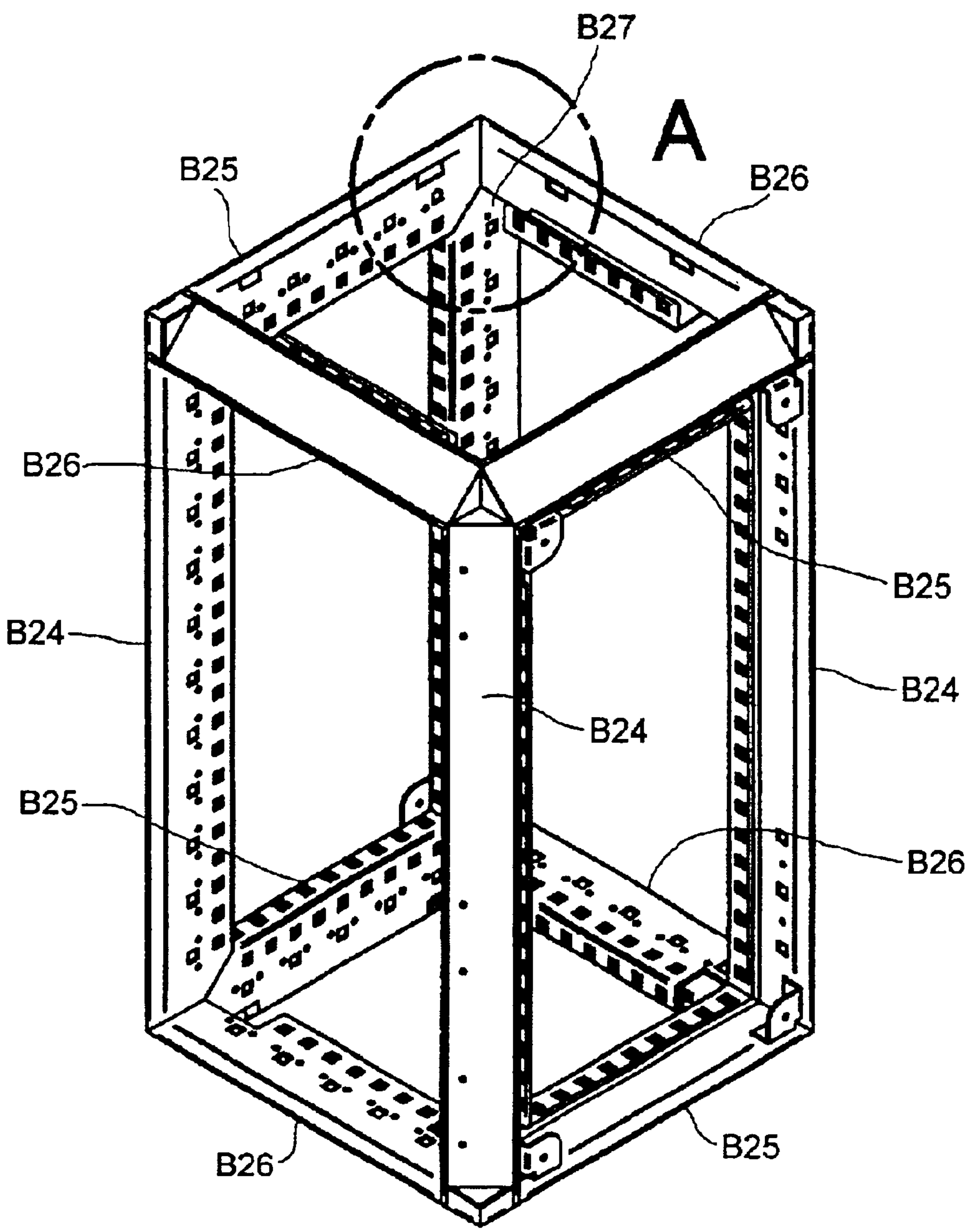
FIG. 16 is a perspective view showing the framework of the cabinet prior to mounting of the base metal fittings.
Figure 17:
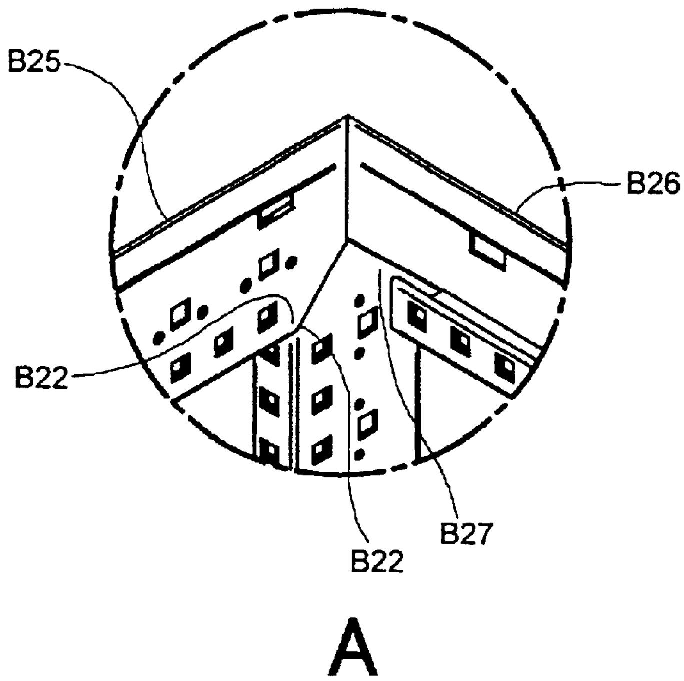
FIG. 17 is an enlarged view showing an essential part of FIG. 16.

FIG. 16 is a perspective view showing a framework of a cabinet prior to mounting of the base metal fittings B23, FIG. 17 being an enlarged view showing an essential part of the framework. In order to connect the frames of the cabinet to one another, the respective frames are cut 45° at corners in a manner to form a picture-frame shaped frame on upper and lower sides, lateral sides and front and rear sides to correspondingly position the equipment mount sides B2, B3 of FIG. 8 between vertical frames B24 and lateral frames B25.

Since the frames are not symmetrical with respect to a frame diagonal line, the equipment mount sides B2, B3 on a width frame in the remaining direction do not correspond, notches B27 for mounting of the base metal fittings B23 are provided on portions disposed at both ends of the width frames B26. The equipment mount sides B2, B3 extend from the hollow portion B1 in a plate-like manner, so that they can be simply cut out by means of a press or the like.

Figure 18:
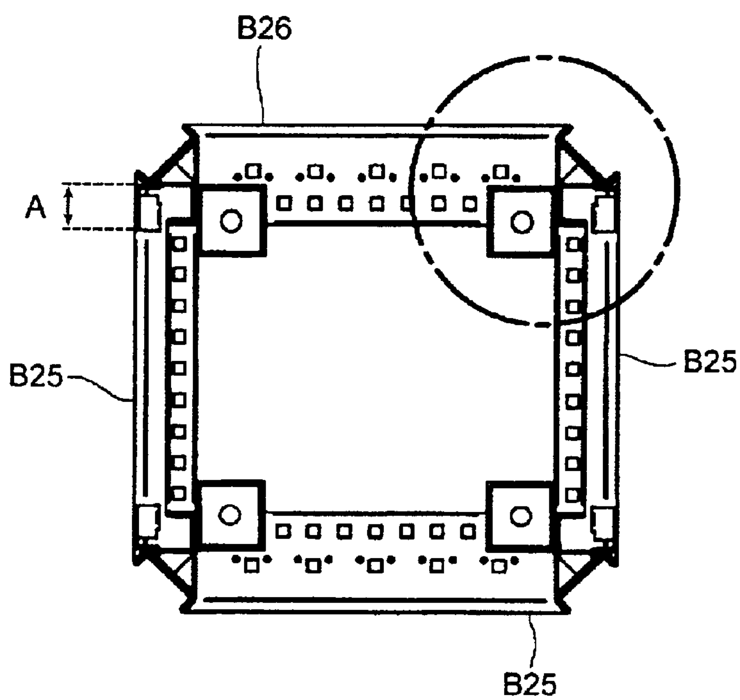
FIG. 18 is a horizontal cross sectional view showing a cabinet, to which base metal fittings is mounted.
Figure 19:
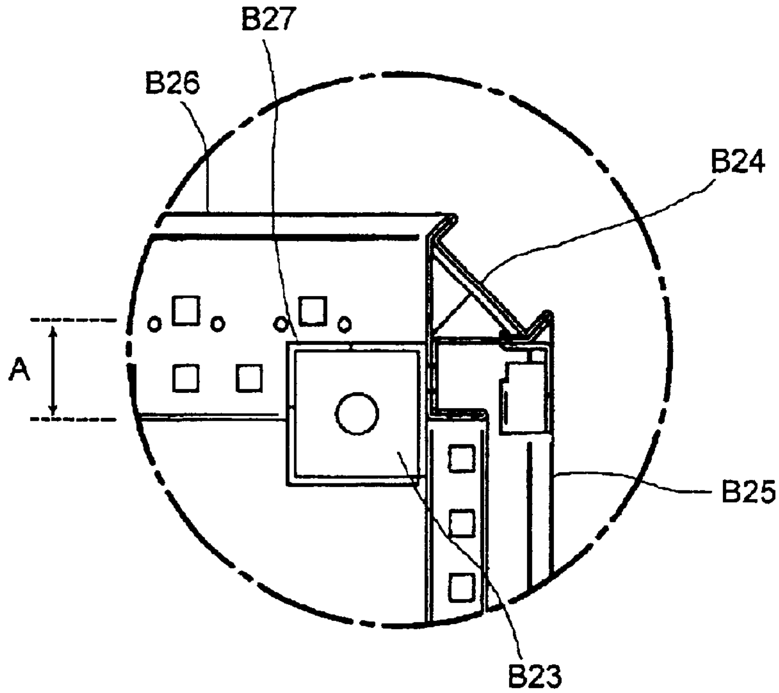
FIG. 19 is an enlarged view showing an essential part of FIG. 18.

As a result, the base metal fittings B23 can be brought close to the corners by a dimension A of the notches B27 shown in a horizontal cross-sectional view of the cabinet in FIG. 18 and in an enlarged view of the essential part in FIG. 19. In this manner, the larger spacings between the four base metal fittings B23, the more strongly the cabinet can be fixed in a location of installation, so that it is possible to enhance the earthquake performance. Incidentally, it is not preferable that when the equipment mount sides B2, B3 is formed not to be plate-shaped but to be hollow, portions thereof cannot be made the notches 27, and the four base metal fittings B23 will be brought close to the inside by a dimension A shown in FIGS. 18 and 19.

Figure 20:
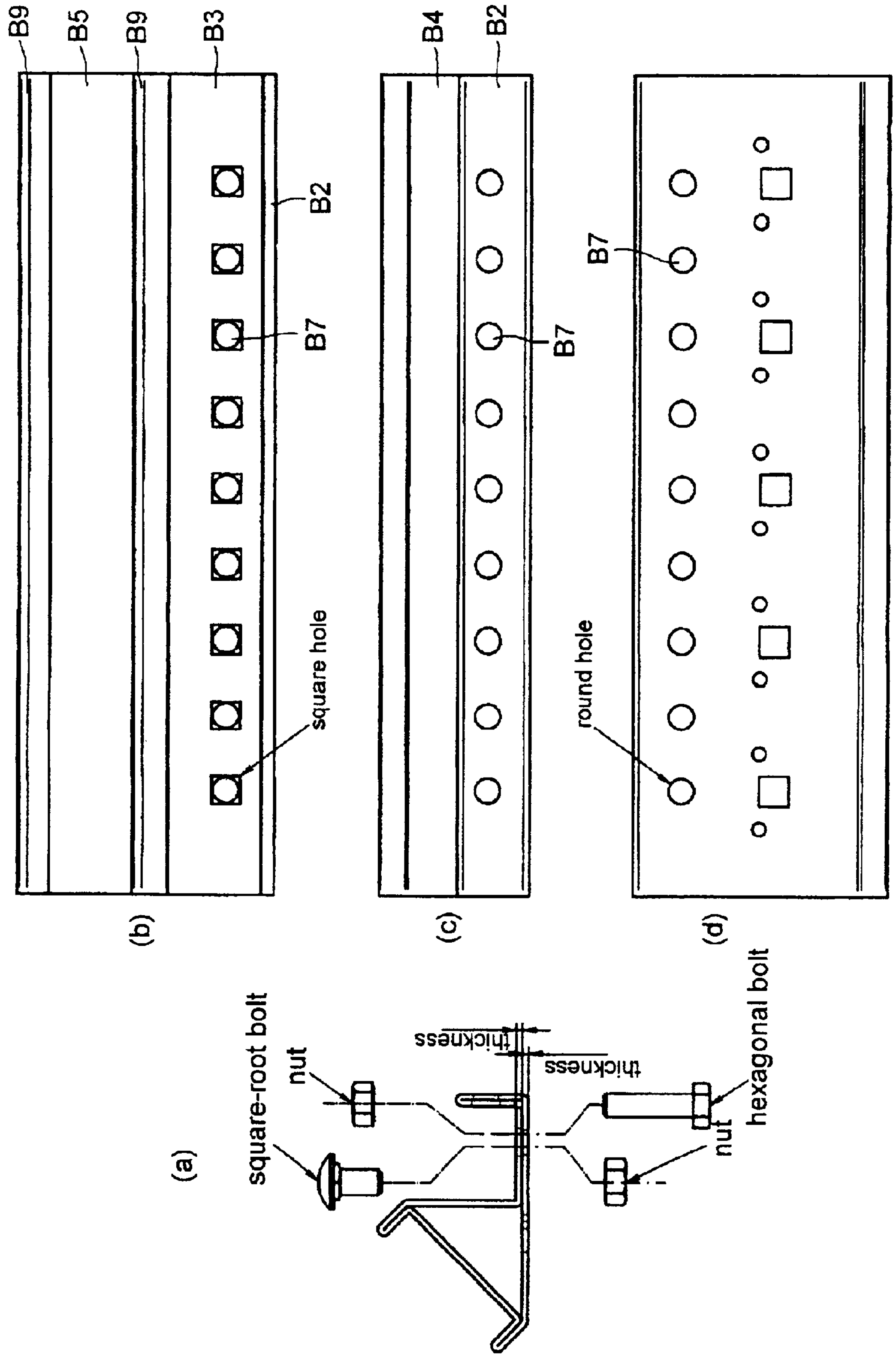
FIG. 20 is a view showing a frame having equipment mount holes, inside of which is circular and outside of which is quadrilateral, FIG. 20(*a*) being a side view, FIG. 20(*b*) being a front view, and FIG. 20(*c*) being a bottom view.

In addition, the equipment mount holes B7 formed in the plate-shaped equipment mount sides B2, B3 are commonly circular in configuration, but equipment mount holes, inside of which is circular and outside of which is quadrilateral, shown in FIG. 20 can serve. With such configuration, equipment mounting is of course made possible by conventional bolts and nuts, and when square neck bolts B30 having a quadrilateral portion at an underhead portion are inserted from outside, they will be fitted into the quadrilateral equipment mount holes to exhibit the latching effect, thereby enabling easily fastening nuts even if the bolts are not pressed from a back side by a tool.

(3) Re: Embodiment Form (C) of the Invention

Figure 21:
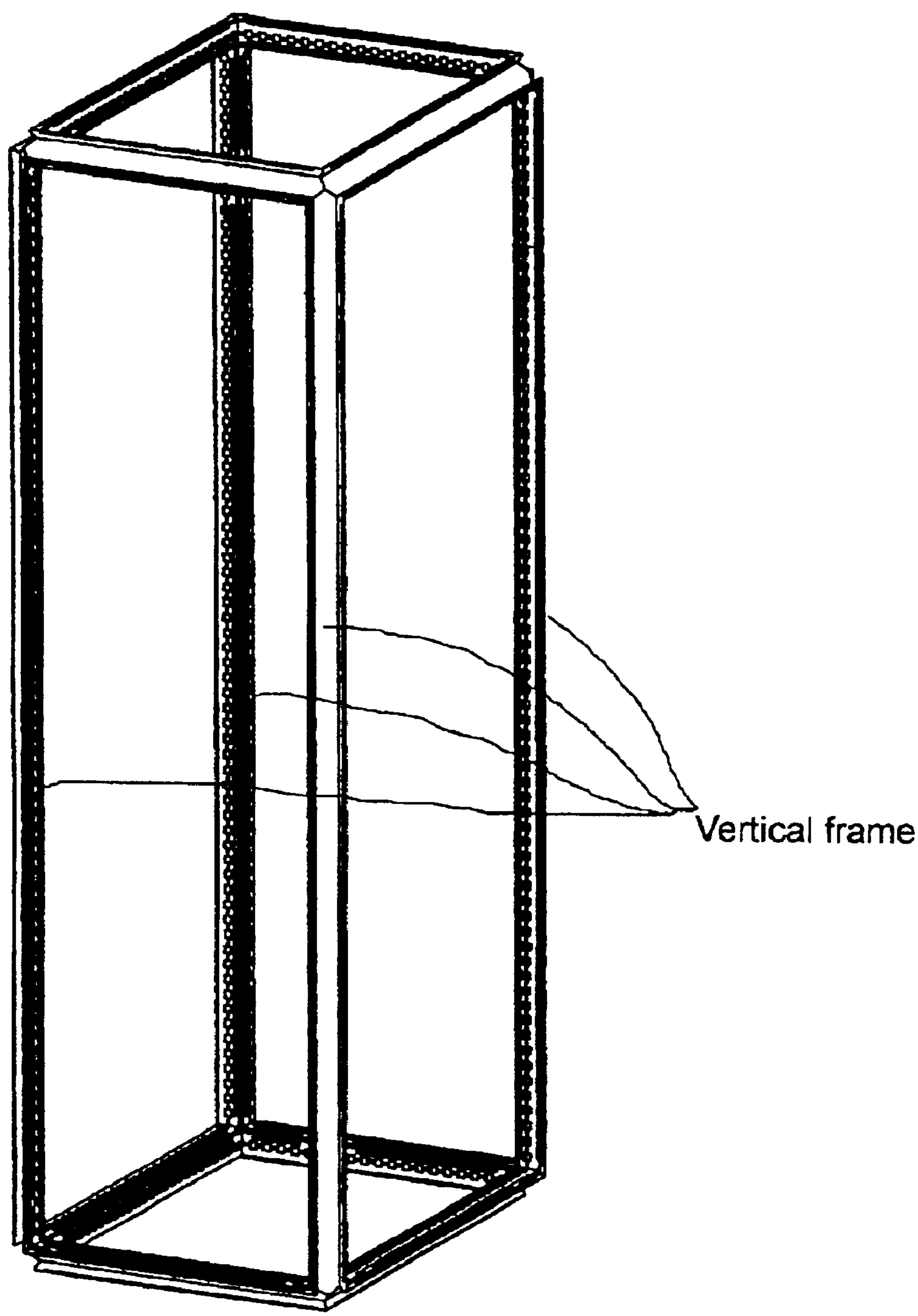
FIG. 21 is a perspective view showing a framework of an electrical and electronic equipment housing cabinet.

FIG. 21 is a perspective view showing a framework of an electrical and electronic equipment housing cabinets, four vertical frames being shown therein. The vertical frames in the embodiment form (C) has a main feature in their cross sectional shapes, and so the following explanation will be solely given on the basis of a horizontal cross sectional view.

Figure 22:
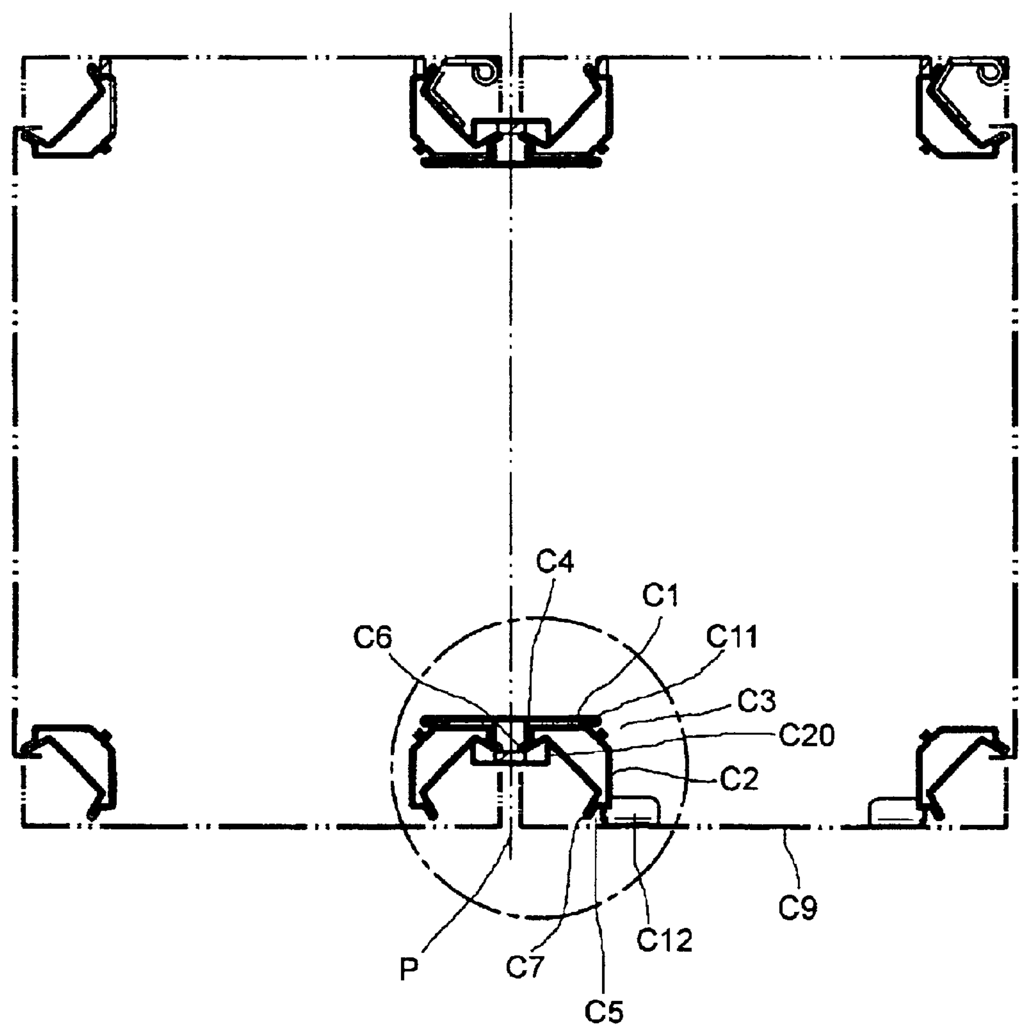
FIG. 22 is a horizontal cross sectional view showing a cabinet according to a first embodiment.
Figure 23:
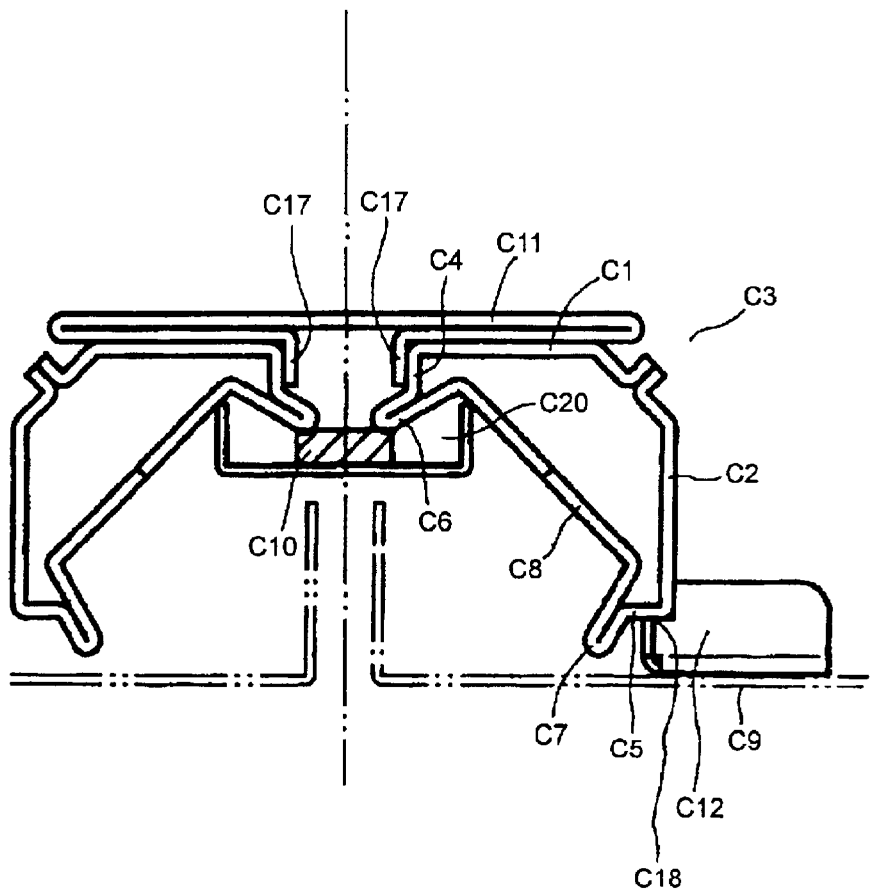
FIG. 23 is an enlarged view showing an essential part of FIG. 22.

FIG. 22 is a view showing a first form of the embodiment form (C), in which two units provided with vertical frames of the invention are connected at four corners to constitute a cabinet. FIG. 23 shows a cross sectional shape of the vertical frame in enlarged scale. The vertical frames in the first form are formed by folding of a metallic sheet or extrusion-molding from a die to be hollow, cross-sectional shaped.

As shown in FIGS. 22 and 23, the vertical frames include a frame body having two perpendicular sides C1, C2, use thereof being such that a point of intersection C3 of these sides C1, C2 is disposed inside the cabinet. It is common that a row of holes for mounting of equipment mount rails are formed in the sides C1, C2. Short formed sides C4, C5 are formed at right angles on ends opposite to the points of intersection C3 of the sides C1, C2, and draining sides C6, C7 extending obliquely relative to the sides C1, C2 are projectingly provided on tip ends of the formed sides C4, C5. A portion inside the right and left draining sides C6, C7 extends further toward the point of intersection C3 than connection points of the formed sides C4, C5, and is made integral by an oblique side C8 connecting with the sides C6, C7.

As shown in FIG. 23, the draining portions C6 abut against a packing C10 provided inside a tip end of an outer wall C9 (here, back face panel) of the cabinet to exhibit a sealing action. In the invention, the draining portions C6 are provided obliquely relative to the outer wall C9 to have tip ends thereof abutting obliquely against the packing 10. Therefore, contact pressure can be made small such that waterproof sealing can be surely effected with small forces.

Also, the draining sides C6, C7 are positioned obliquely in this manner whereby water retaining portions C20 can be ensured and serve advantageously as vertical flow passages to facilitate flowing-down of rainwater.

Also, the formed sides C4, C5 are disposed more inside (side farther than an outside corner point P) the cabinet than the draining sides C6, C7 and formed in parallel to the outer wall C9. Therefore, in the invention, the formed sides C4, C4 are made use of for mounting of a connection metal fittings C11 as shown in FIGS. 22 and 23. Such connection metal fittings C11 is screwed and fixed in a conventional manner, and auxiliary plate portions C17, C17 are bent to conform to the adjacent formed sides C4, C4 of the frame. With such arrangement, the adjacent frames are firmly supported at the time of earthquake by the formed sides C4, C4, against which the reinforcing plate portions C17, C17 of the connection metal fittings C11 about.

Also, the other formed sides C5, C5 are made use of for mounting to the outer wall C9 with metal fittings C12. Abutting portions C18 of the metal fittings C12 abut against the formed sides C5 of the vertical frame to bear forces at the frame surfaces in the same manner as in the case of the connection metal fittings even when forces act on the outer wall C9 to provide a firm structure since such forces are not born at screw portions. In this manner, since the formed sides C4, C5 are provided to be disposed inside the draining sides C6, C7 and in parallel to the outer wall, load such as the connection metal fittings C11 and the outer wall is not born by screw portions as in a conventional manner but is born by the formed sides of the frame, resulting in an effect that the structure is made strengthened.

Figure 24:
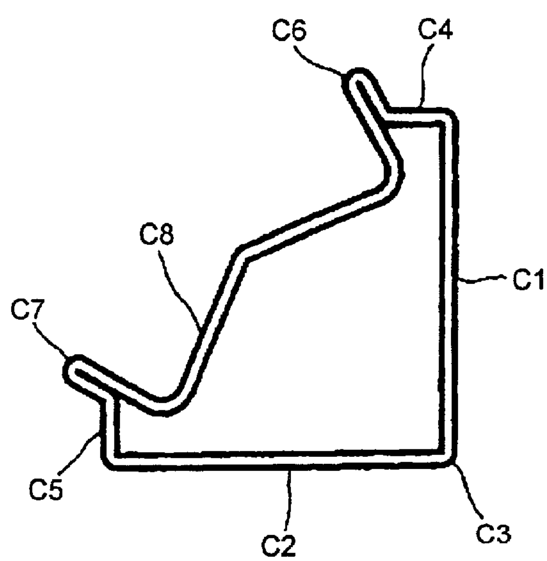
FIG. 24 is a horizontal cross sectional view showing a vertical frame according to a second embodiment.

FIG. 24 ff are views showing variations in cross sectional shape.

13-1

Figure 25:
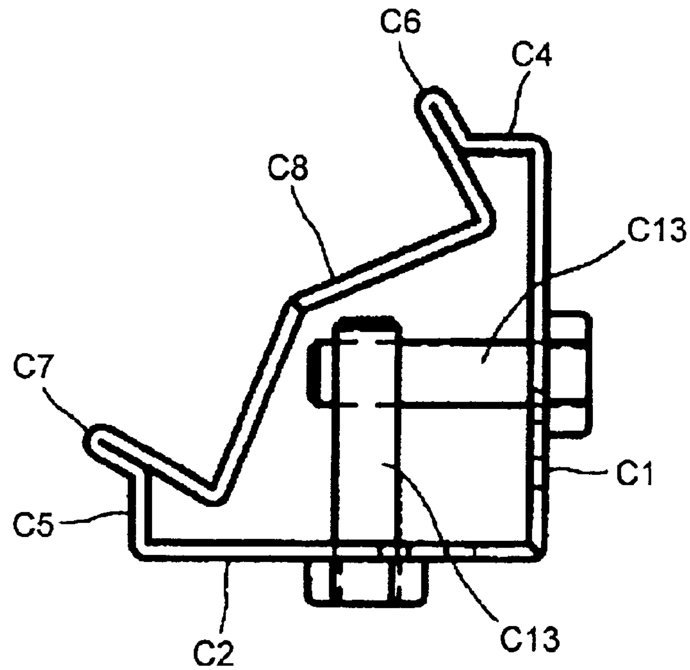
FIG. 25 is a horizontal cross sectional view showing an example in use.

First, FIG. 24 shows a second form, in which an oblique side C8 provided between right and left draining sides C6, C7 is expanded outward. Such expansion of the oblique side C8 exhibits a rib effect to increase strength, and in the case where lengthy bolts C13 for securement of equipment mount rails are mounted to sides C1, C2 as shown in FIG. 25, there is produced an advantage that interference with the oblique side C8 is hard to occur.

Figure 26:
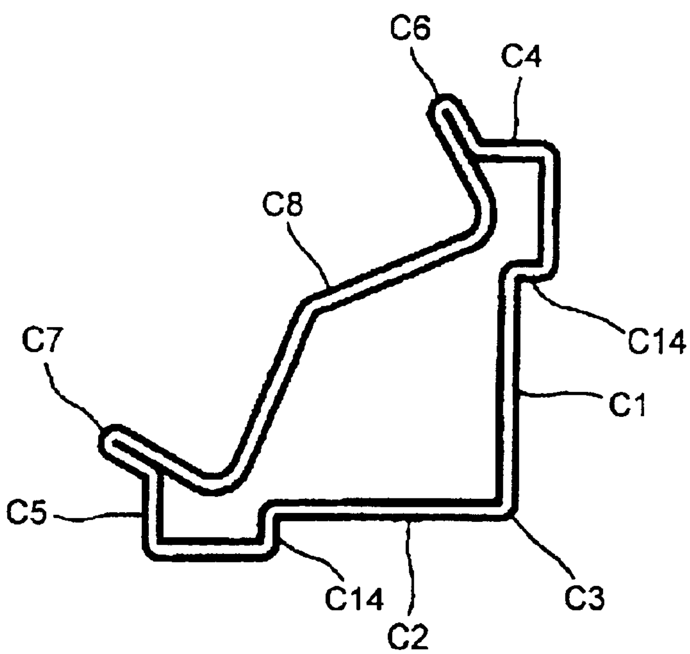
FIG. 26 is a horizontal cross sectional view showing a vertical frame according to a third embodiment.

A vertical frame of a third form shown in FIG. 26 comprises steps C14 on sides C1, C2. The vertical frame in any form has the basic sha shown in FIG. 1, and so the same reference numerals are used to denote the corresponding parts, an explanation therefor being omitted.

Vertical frames according to fourth to seventh embodiments shown in FIGS. 27 to 30 are such that sides C1, C2, which form a frame body, are recessed outside a cabinet.

Figure 27:
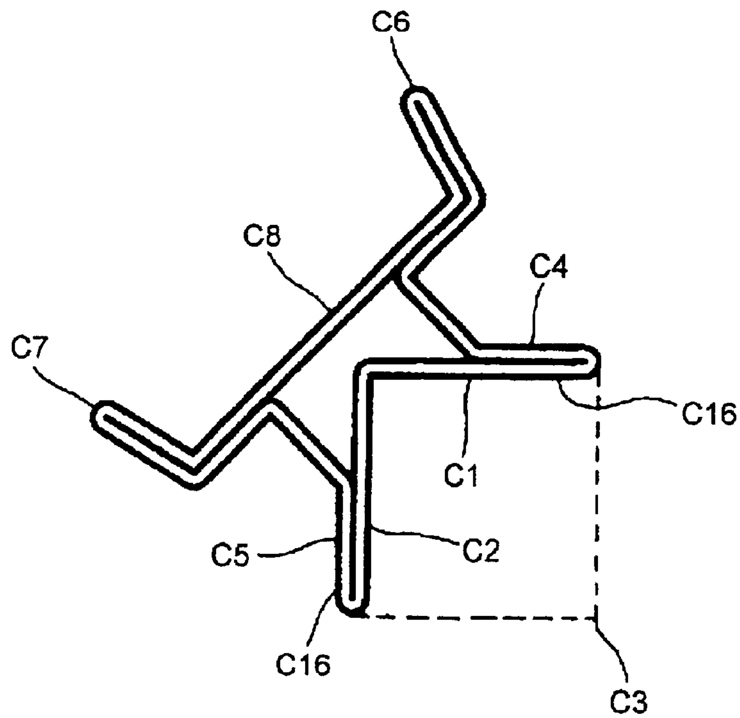
FIG. 27 is a horizontal cross sectional view showing a vertical frame according to a fourth embodiment.
Figure 28:
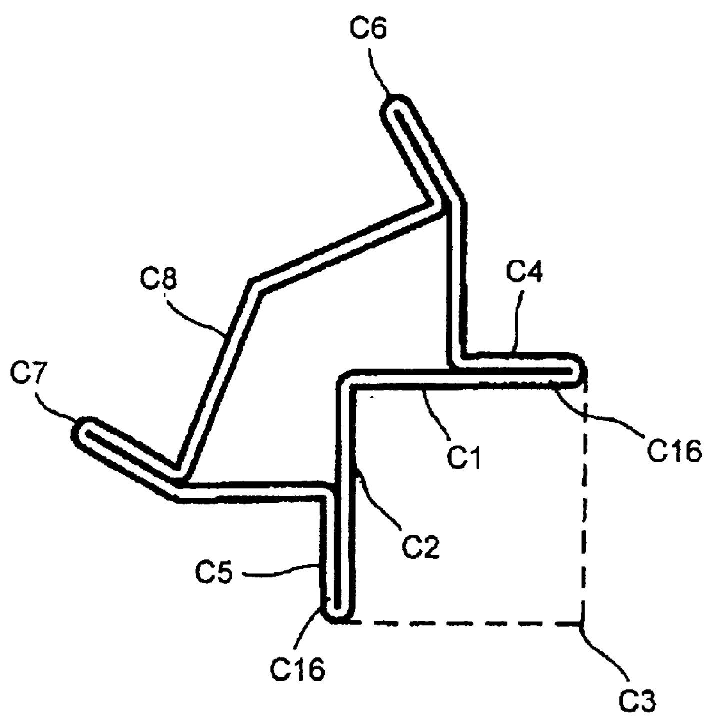
FIG. 28 is a horizontal cross sectional view showing a vertical frame according to a fifth embodiment.
Figure 29:
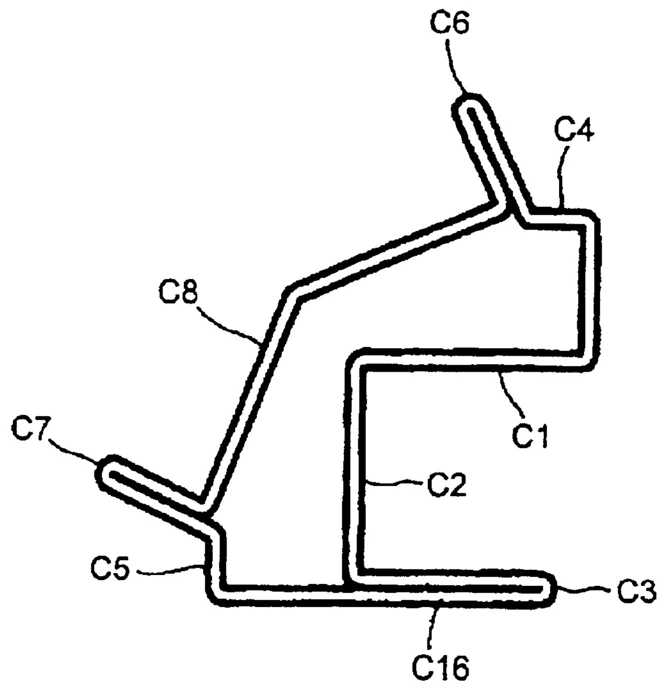
FIG. 29 is a horizontal cross sectional view showing a vertical frame according to a sixth embodiment.
Figure 30:
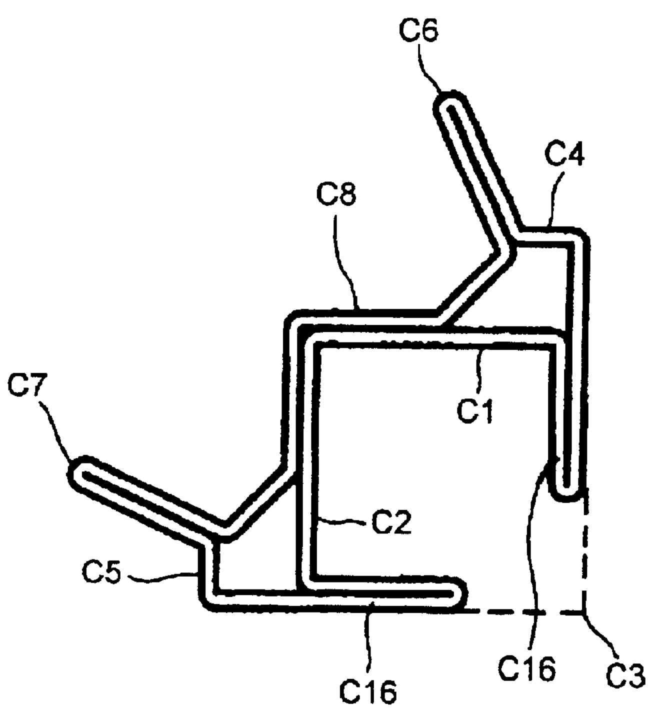
FIG. 30 is a horizontal cross sectional view showing a vertical frame according to a seventh embodiment.
Figure 31:
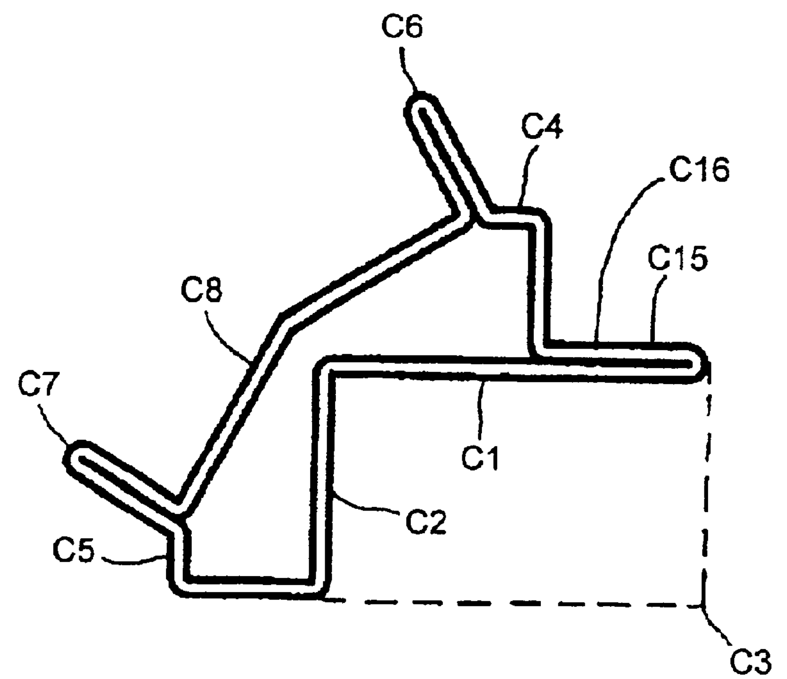
FIG. 31 is a horizontal cross sectional view showing a vertical frame according to an eighth embodiment.
Figure 32:
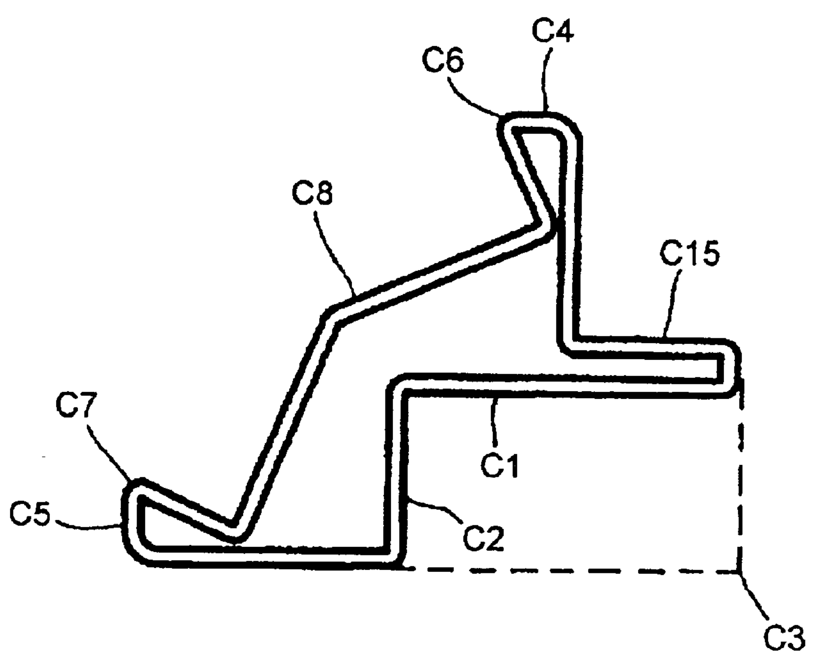
FIG. 32 is a horizontal cross sectional view showing a vertical frame according to a ninth embodiment.
Figure 33:
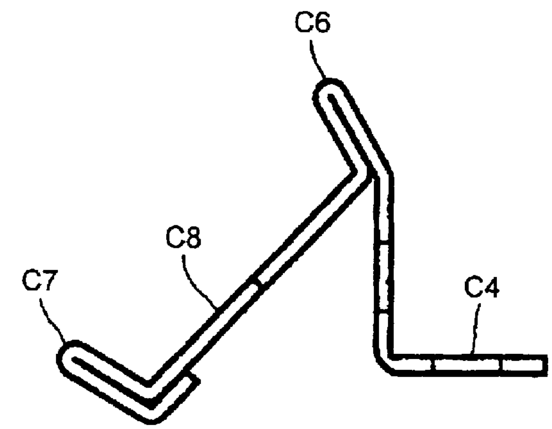
FIG. 33 is a horizontal cross sectional view showing a vertical frame according to a tenth embodiment.
Figure 34:
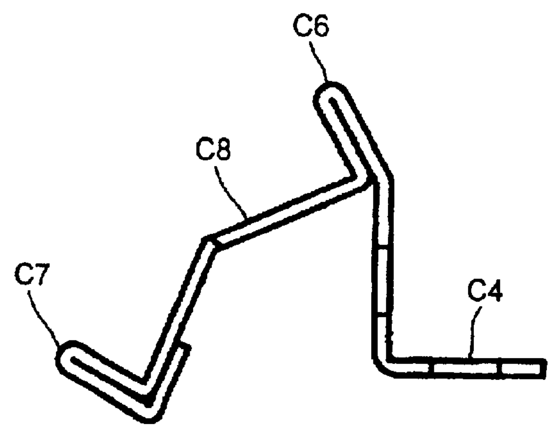
FIG. 34 is a horizontal cross sectional view showing a vertical frame according to an eleventh embodiment.
Figure 35:
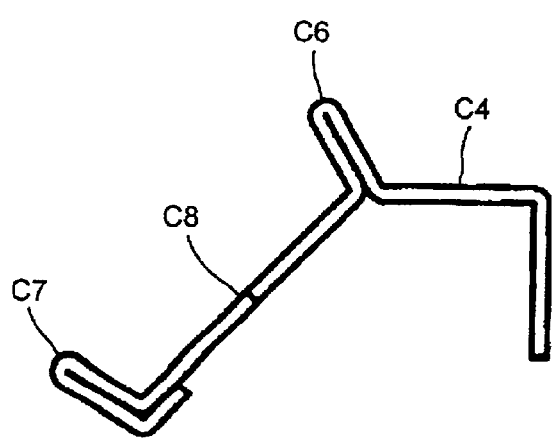
FIG. 35 is a horizontal cross sectional view showing a vertical frame according to a twelfth embodiment.
Figure 36:
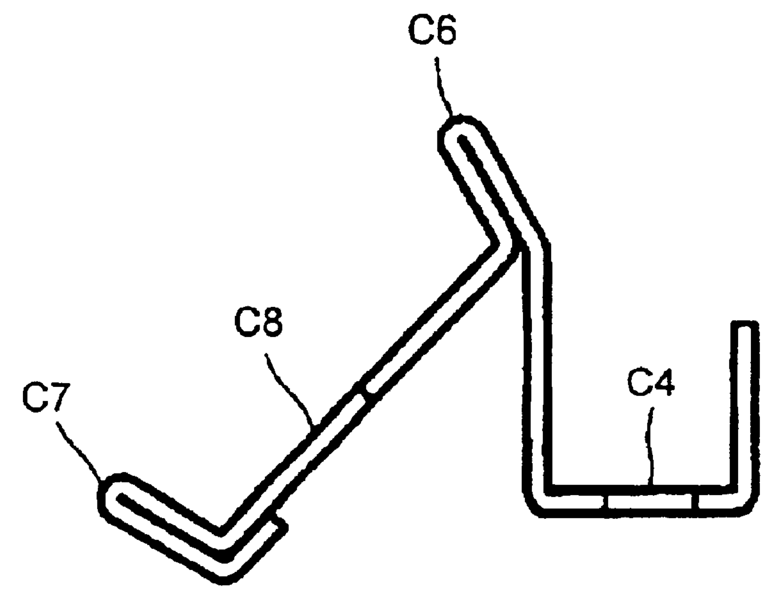
FIG. 36 is a horizontal cross sectional view showing a vertical frame according to a thirteenth embodiment.

Vertical frames according to eighth and ninth embodiments shown in FIGS. 31 and 32 are such that one of sides C1, C2, which form a frame body, is formed with an extension 15. Thereby, an effect of an increase in strength is obtained. In addition, the vertical frames according to the fourth to eighth embodiments shown in FIGS. 27 and 31 are provided with a folded side C16. While equipment mount rails or the like are screwed into a row of holes on the sides C1, C2 in the above-mentioned embodiments, the double-walled plate portions can be secured on both sides thereof by fastening bolts and nuts to thereby afford firm mounting.

In the respective embodiments described above, all the frame bodies have a hollow, cross-sectional shape. With vertical frames according to eighth to eleventh embodiments shown in FIGS. 33 to 36, frame bodies are non-hollow shaped. These are disadvantageous in terms of strength, but are easy in folding, so that they are suited for small and medium cabinets, for which strength is not so much required.

Figure 37:
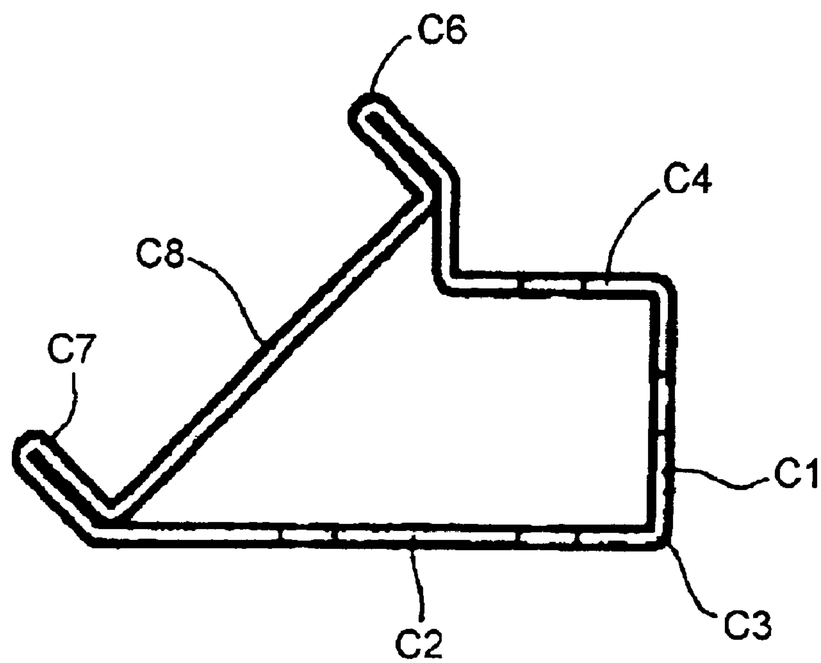
FIG. 37 is a horizontal cross sectional view showing a vertical frame according to a fourteenth embodiment.

A vertical frame according to a fourteenth embodiment shown in FIG. 37 is hollow-shaped such that a formed side C4 is provided in a location disposed far back from a base of a draining side C6. This vertical frame comprises three equipment mount faces, and the hollow frame is extended in a depth direction when a side C1 is made along a depth direction and a side C2 is made along a door-opening direction, so that an increase in strength is achieved to enable ensuring a wide door opening.

Figure 38:
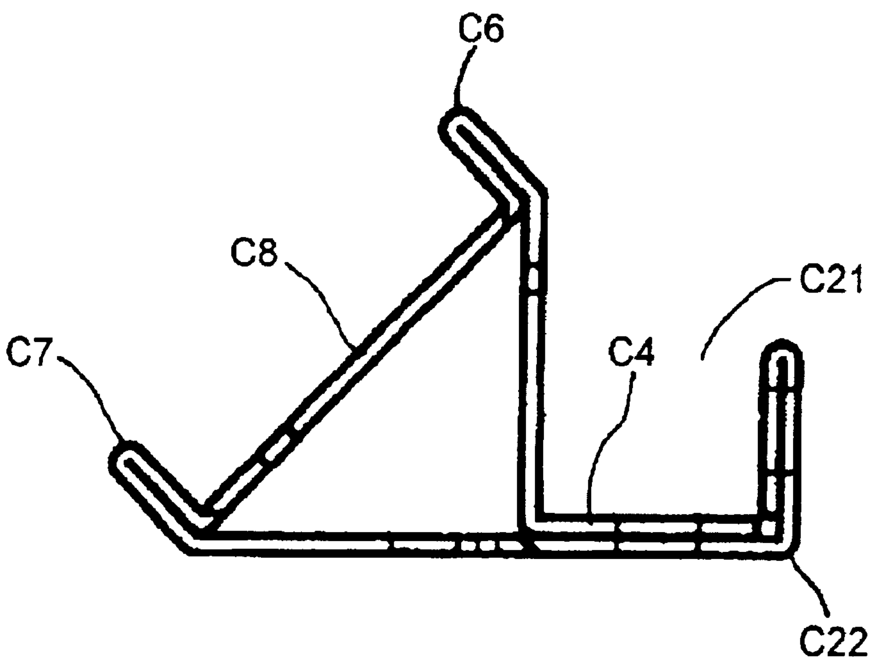
FIG. 38 is a horizontal cross sectional view showing a vertical frame according to a fifteenth embodiment.

FIG. 38 shows a vertical frame according to a fifteenth embodiment, the vertical frame being provided with a hollow, triangular-shaped portion, from which is extended a plate-shaped orthogonal equipment mount portion C22 provided with rows of holes on two sides including a formed side C4, the hollow portion and the plate-shaped orthogonal equipment mount portion C22 being separately disposed. The vertical frame is enhanced in strength and permits bolts to be inserted from a side of an opening 21 on the plate-shaped orthogonal equipment mount portion C22, so that mounting of equipments can be made without the use of special bolts and nuts. Besides, the hollow, triangular-shaped portion is provided with a row of equipment mount holes, and so can accommodate various internally-stored equipments.

Figure 39:
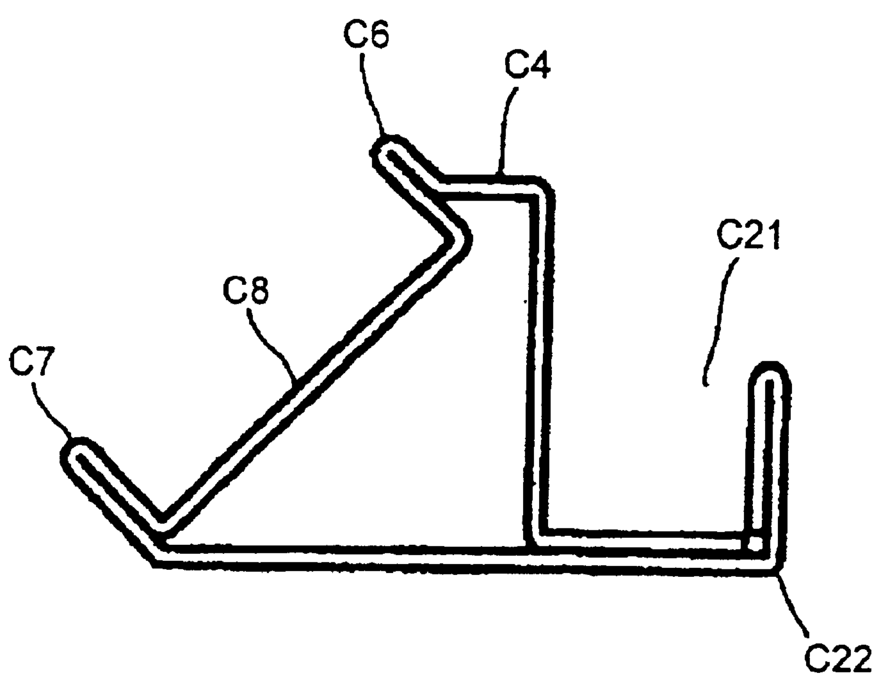
FIG. 39 is a horizontal cross sectional view showing a vertical frame according to a sixteenth embodiment.

Also, the equipment mount portion C22 is double in plate thickness to excellent in strength of mounts and afford spot welding, so that manufacture is made easy to lead to cost reduction. In addition, a vertical frame according to a sixteenth embodiment shown in FIG. 39 is a modification of the vertical frame according to the fifteenth embodiment such that a formed side C4 is provided on a draining side C6. When the formed side C4 is disposed on a side of a cabinet, connection of sides is made easy and a wide door opening can be ensured.

Figure 40:
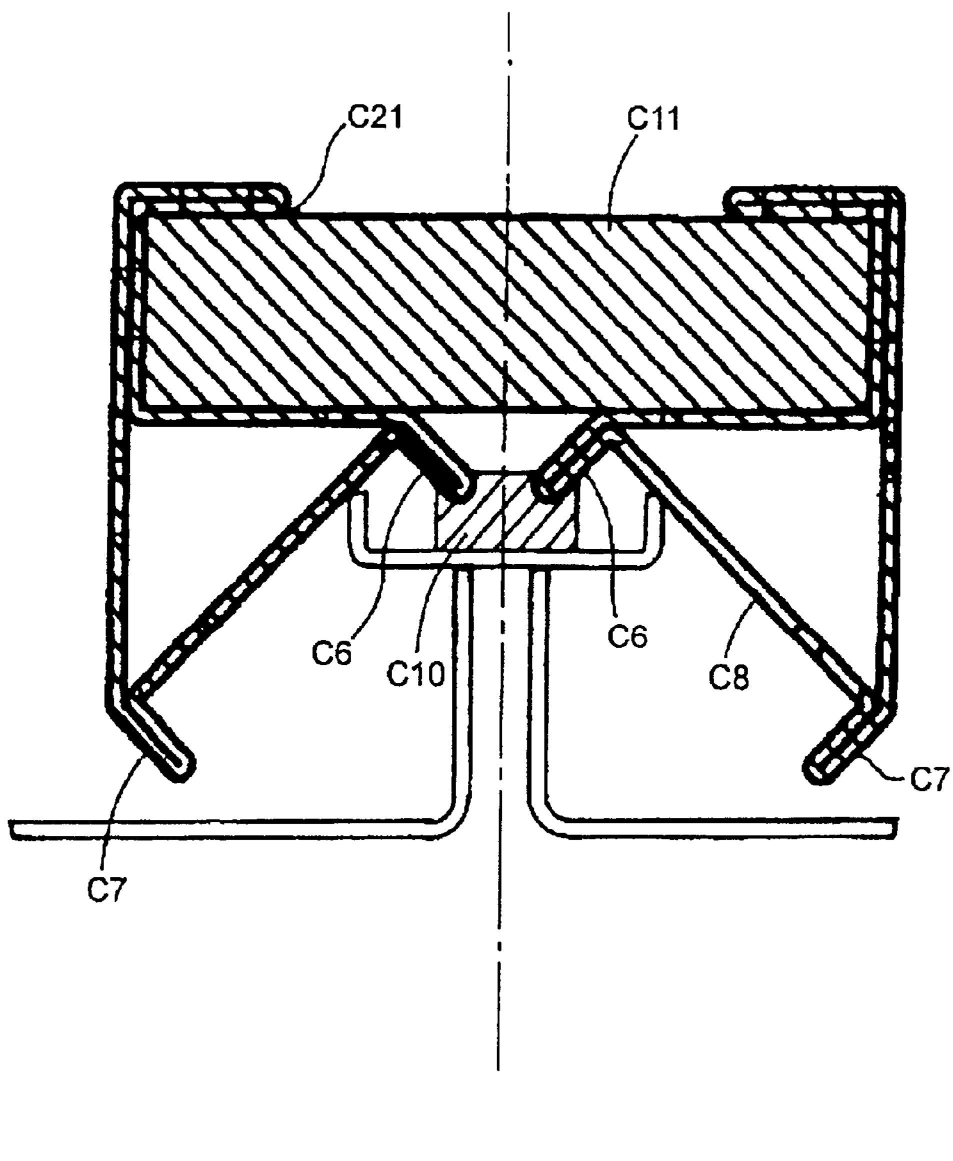
FIG. 40 is a horizontal, cross-sectional view in enlarged scale when vertical frames according to the fifteenth embodiment are connected together.

Also, FIG. 40 is a horizontal, cross-sectional view in enlarged scale when cabinets with such vertical frames are connected together. A connection metal fittings C11 is received in an opening C21 defined by orthogonal equipment mount portions C22 of both vertical frames and can be surface-born to provide firm securement, the metal fittings not extending inside the cabinets. In addition, the connection metal fittings can be mounted outside the opening C21 as well as the manner described above.

(4) Re: Embodiment Form (D)

Figure 41:
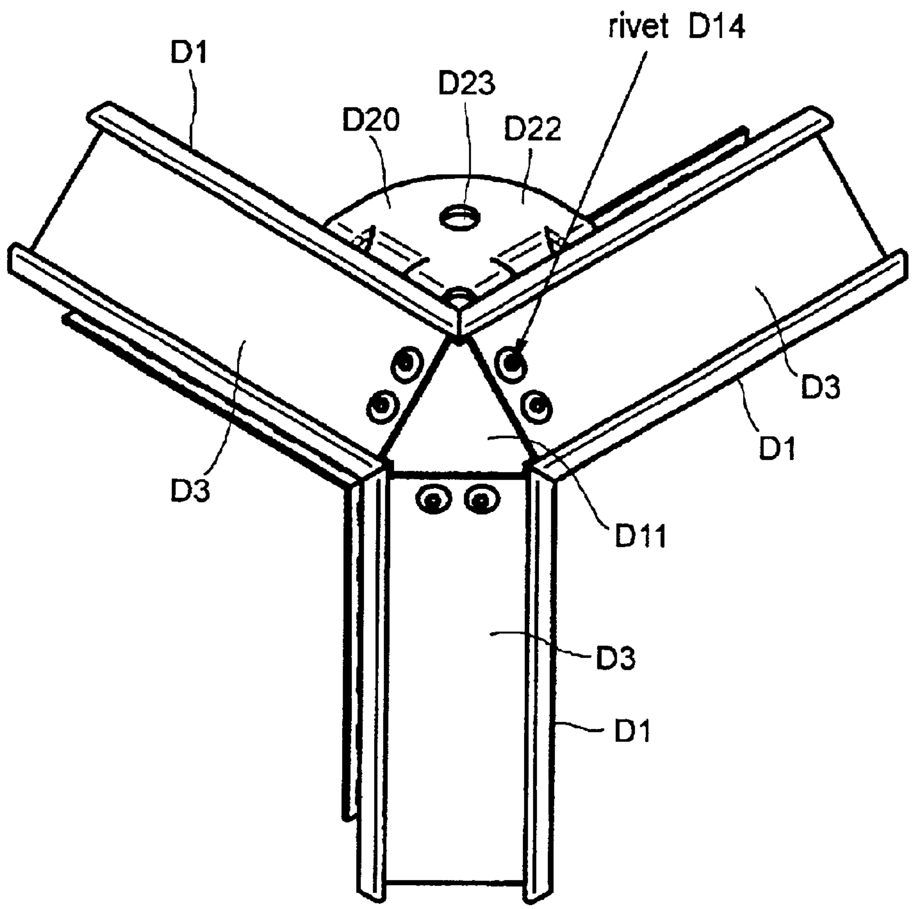
FIG. 41 is a perspective view of a corner portion of the first embodiment as viewed from outside a cabinet.
Figure 42:
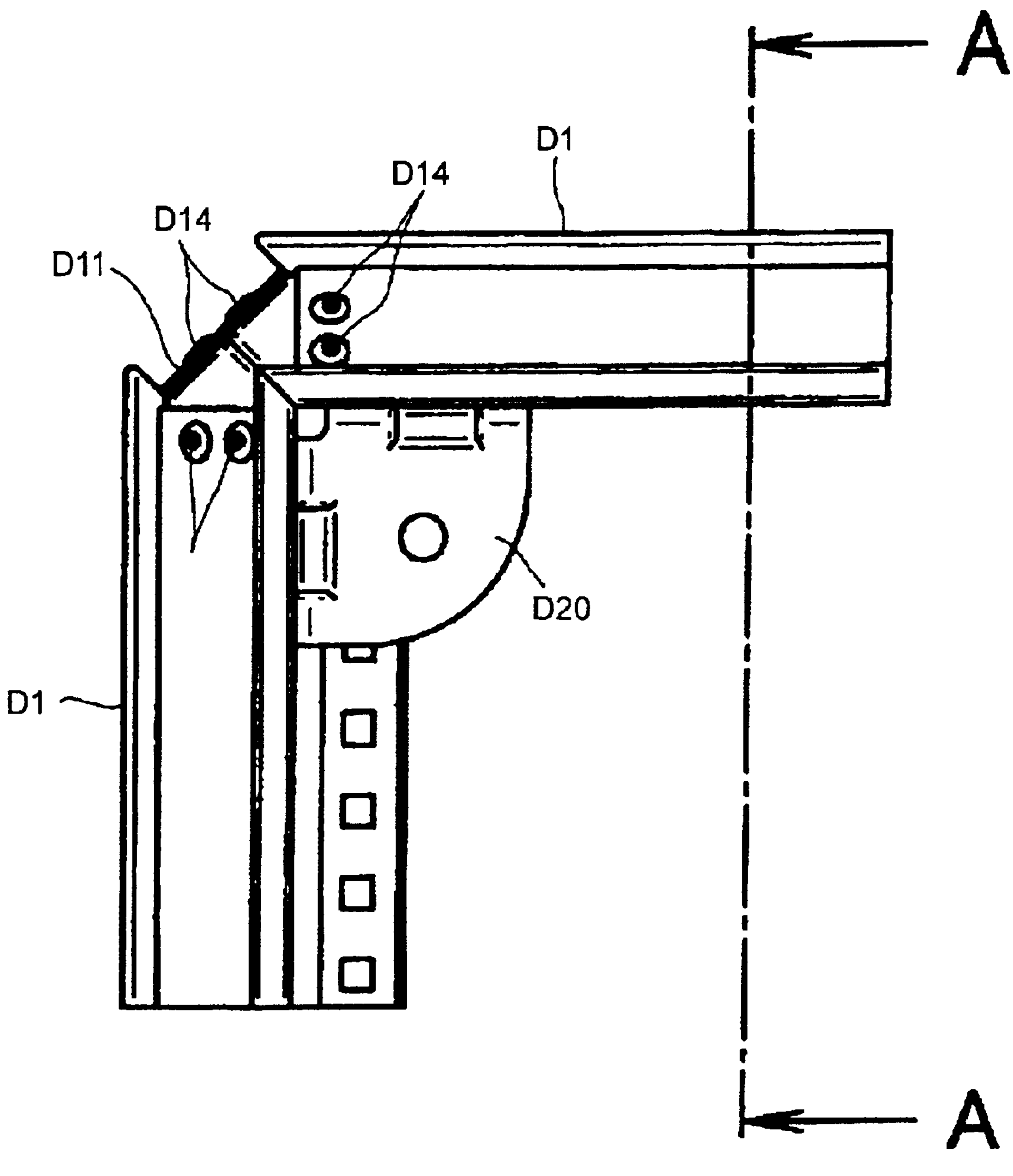
FIG. 42 is a plan view showing the corner portion of the first embodiment.
Figure 43:
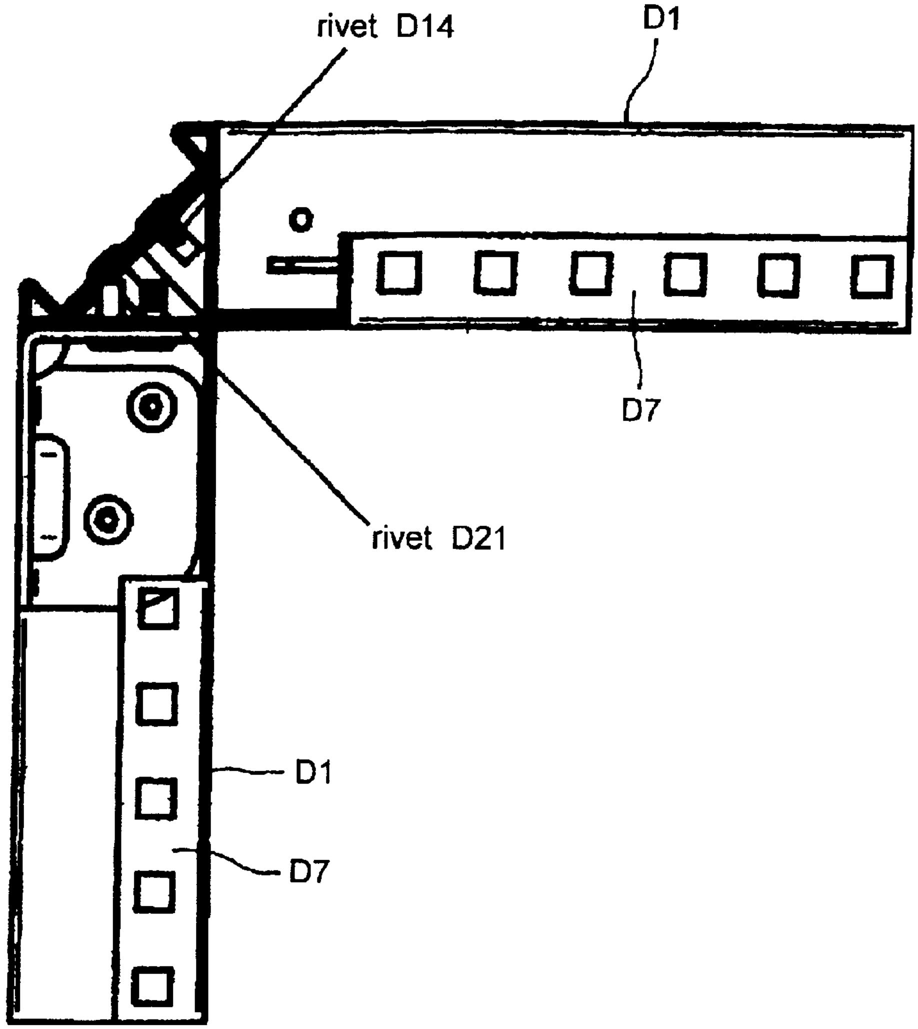
FIG. 43 is a cross sectional view taken along A-A in FIG. 42.
Figure 44:
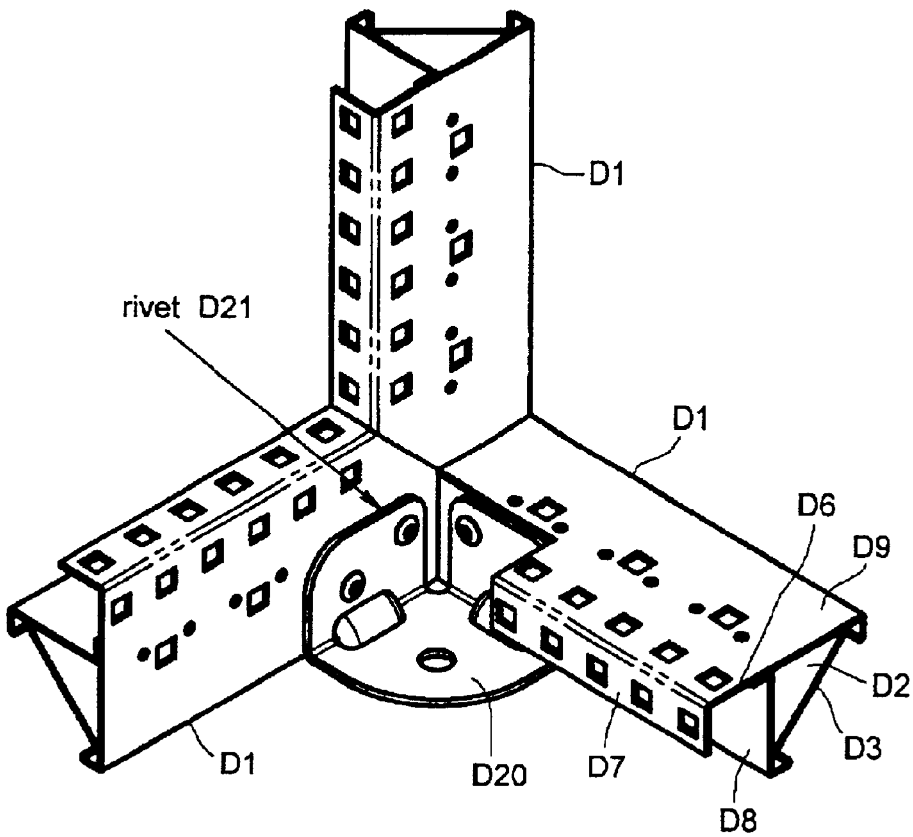
FIG. 44 is a perspective view showing the corner portion as viewed from inside the cabinet.

FIGS. 41 to 49 show a first embodiment of the embodiment form (D), FIG. 41 being a perspective view of a corner portion as veiwed from outside a cabinet, FIG. 42 being a front view showing the corner portion, FIG. 43 being a cross sectional view, and FIG. 44 being a perspective view of the corner portion as viewed from inside the cabinet. As shown in these drawings, the corner portion is formed by joining ends of three orthogonal frames D1 in vertical, lateral and depthwise directions.

Figure 45:
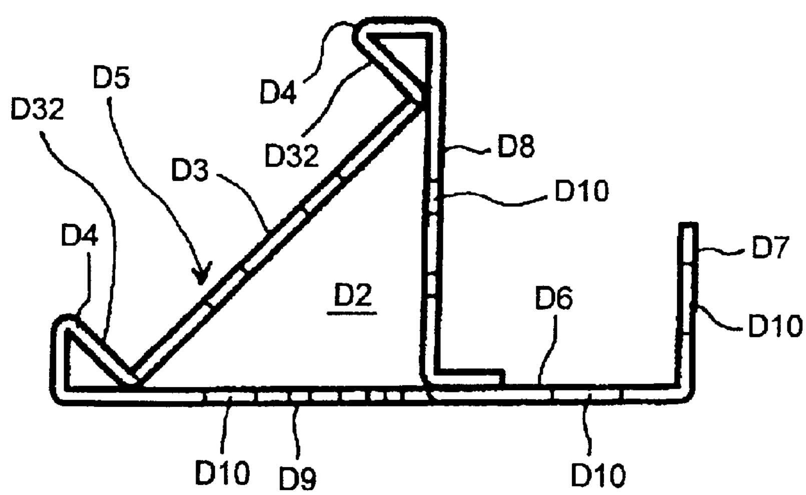
FIG. 45 is a cross sectional view showing a frame.
Figure 46:
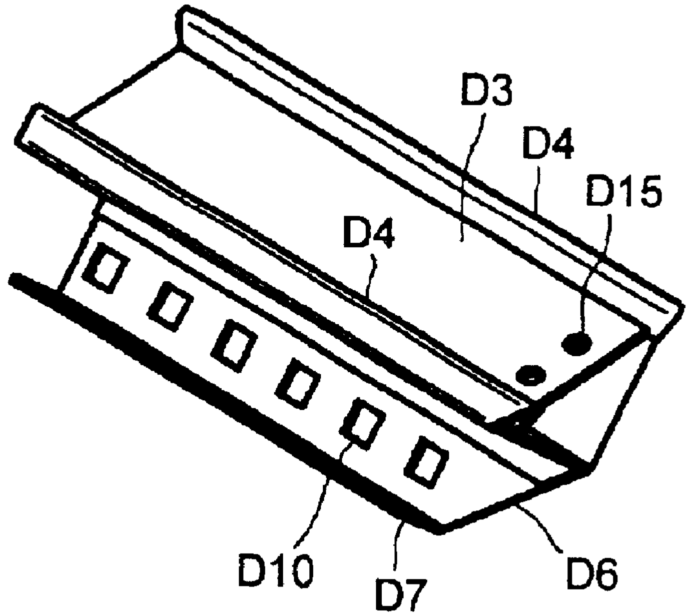
FIG. 46 is a cross sectional view showing a frame.
Figure 47:
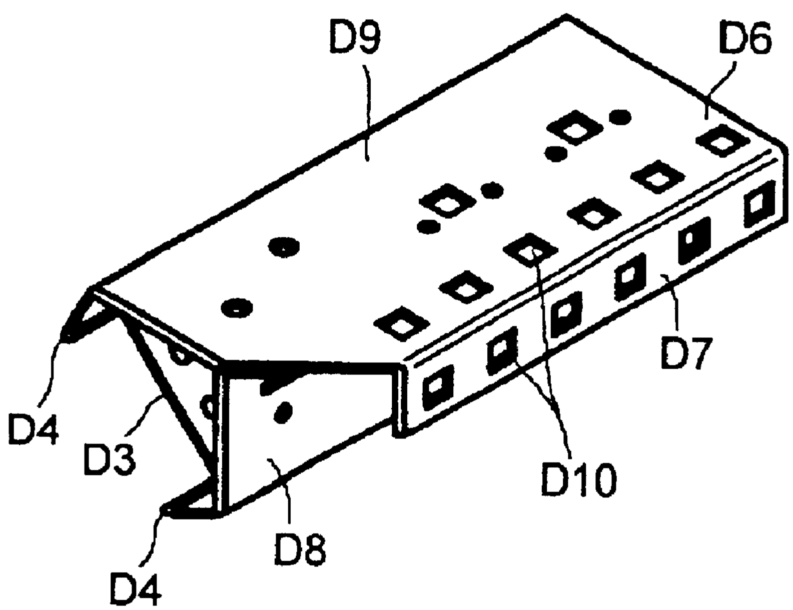
FIG. 47 is a cross sectional view showing a frame.

The frames D2 according to the first embodiment are formed by folding a steel sheet into the same cross-sectional shape as shown in FIGS. 45 to 47. More specifically, the respective frames D1 comprises a recessed portion D5 as a draining portion by using side walls D32, D32 directed toward the corner to form substantially hollow projections D4, D4 on both ends of an oblique side D3 of a right-angled triangular-shaped hollow portion D2, and a right-angled folded side D7 on a tip end of an extension side D6 extended from the hollow portion D2. The projections D4, D4 serve as portions abutting against a door, side panels, a roof D4 of an electrical and electronic equipment housing cabinet.

In FIG. 45, a rightward and downward portion relative to the abutting portions is disposed inside the cabinet, and a leftward and upward portion where the recessed portion D5 is present is disposed outside the cabinet. Rows of holes D10 for mounting of equipments are formed on orthogonal sides D8, D9, the extension side D6, the right-angled folded side D7 and the like among frame inside portions disposed inside the cabinet.

The projections D4, D4 are formed to be substantially hollow to define the recessed portion D5 serving as a frame draining portion, and three hollow portions, that is, one large right-angled triangular hollow portion and two small right-angled triangular hollow portions, are present on the frame. Therefore, since the draining portion is hollow as compared with a conventional plate-shaped or L-shaped draining side from a hollow portion, the draining portion itself is enhanced in strength. In addition, the projections D4 are closed in shape, but the above-mentioned effect can be obtained even when they are substantially hollow-shaped and slightly opened.

Figure 48:
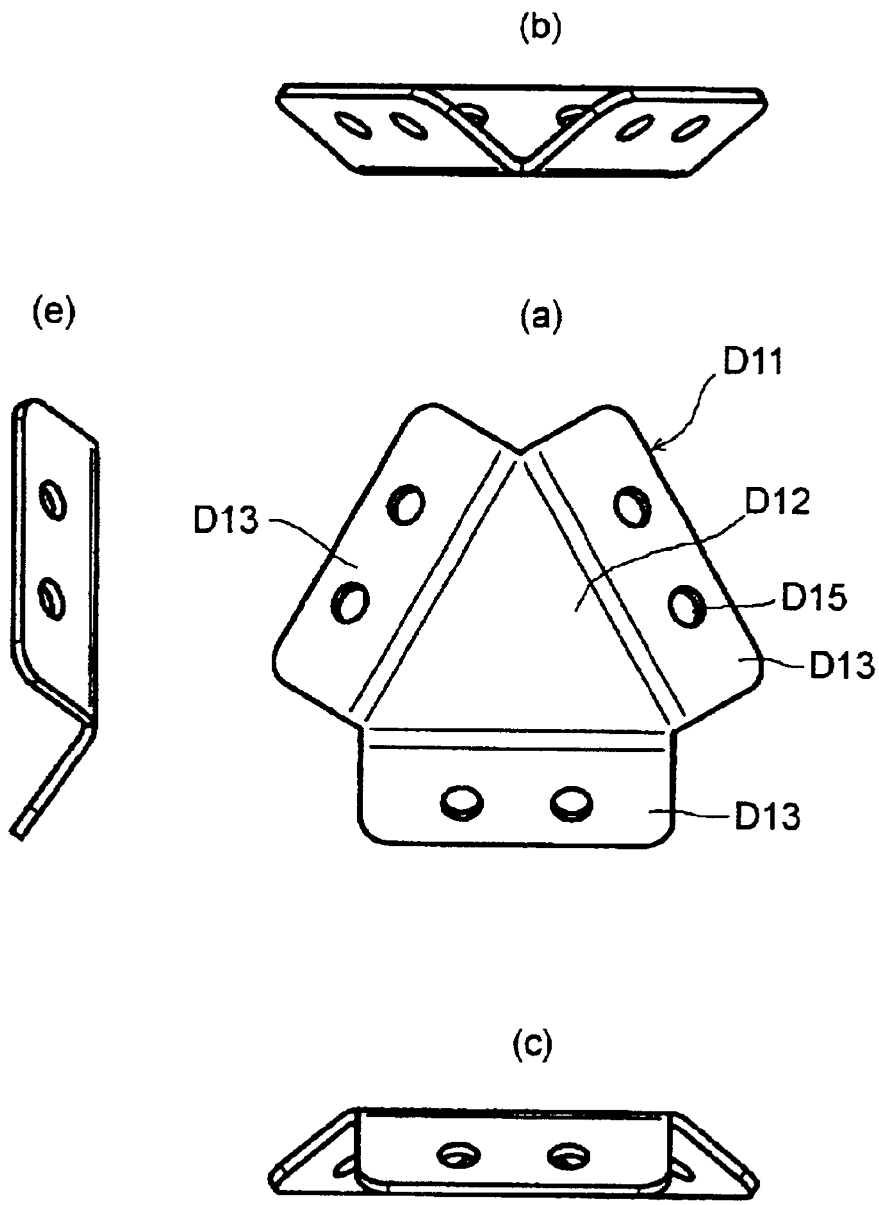
FIG. 48 is view showing a corner piece, (*a*) being a front view, (*b*) being a plan view, (*c*) being a bottom view, (*d*) being a right-side view, and (*e*) being a left-side view.

In the embodiment, a corner piece D11 shown in FIG. 48 is fitted into an equilateral triangular space, which the three frames D1 are made orthogonal to define between end surfaces of the oblique sides D3. The corner piece D11 comprises joint sides D13 having a predetermined angle (135°) and formed on respective sides of an equilateral triangular, flat plate D12, the respective joint sides D13 being formed with insertion holes D15 for rivets D14. Also, insertion holes D15 for rivets D14 are formed near ends of the oblique sides D3 of the frames D1, the respective joint sides D13 of the corner piece D11 are inserted into the hollow portions D2 of the three frames D1, and the rivets 14 are struck as shown in FIGS. 41 and 43 to join the three frames D1.

Figure 49:
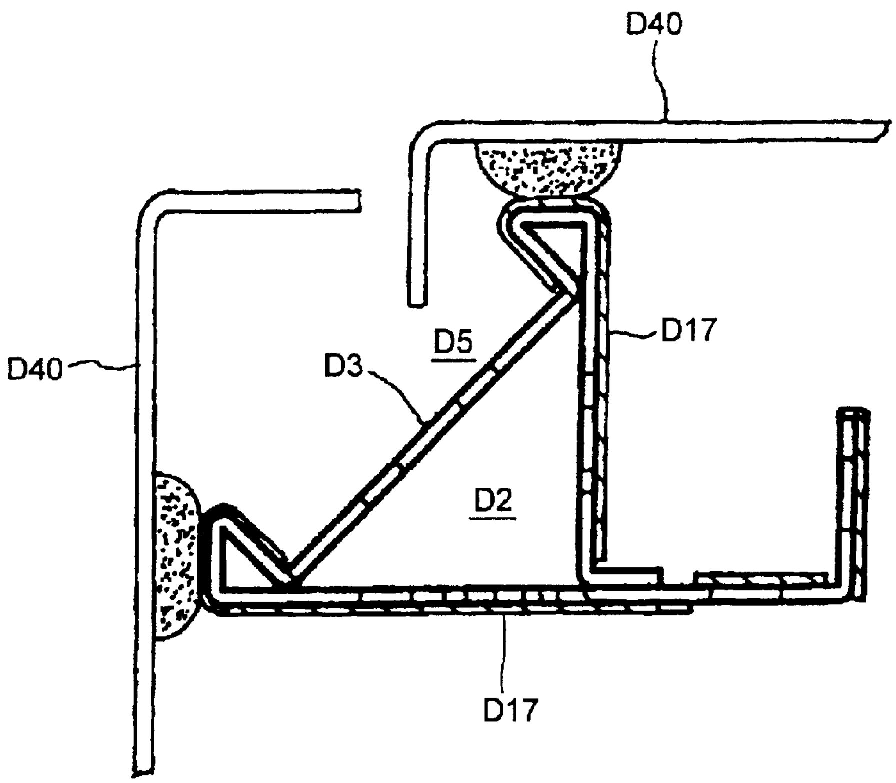
FIG. 49 is a cross sectional view showing a frame.

In this manner, while the oblique sides D3 of the frames D1 are joined through the corner piece D11 by the rivets 14, which are of one kind of fasteners, other respective sides of the frames D1 are joined together by welding. FIG. 49 shows welds D17 by hatching. Thus securement by fasteners is combined with welding to enable adequate strength and rigidity. In addition, screws, bushes or the like can be given as fasteners.

Figure 50:
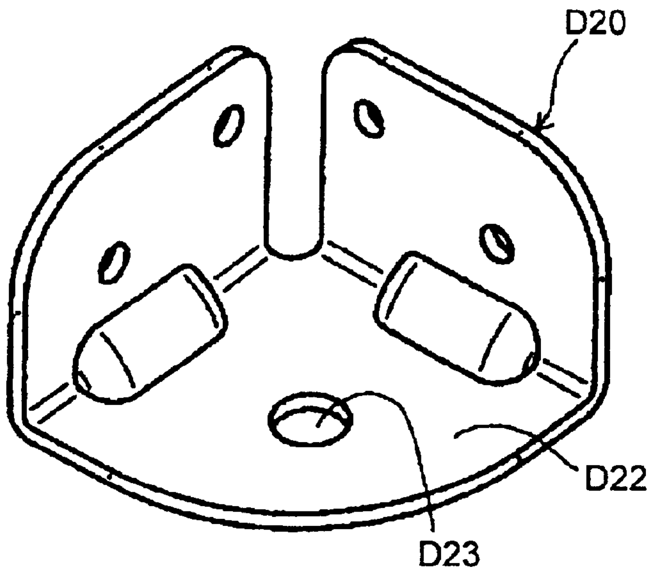
FIG. 50 is a view showing a base connection metal fittings, (*a*) being a perspective view, (*b*) being a front view, (*c*) being a side view, and (*d*) being a bottom view.
Figure 50:
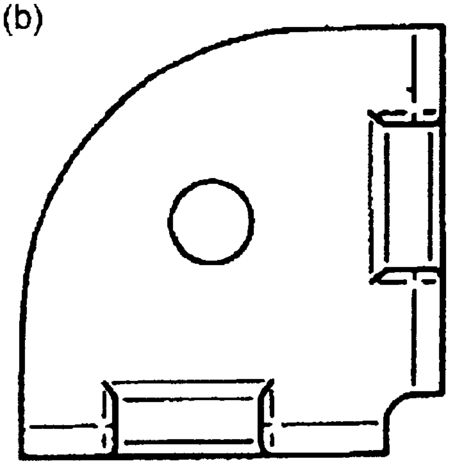
Figure 50:
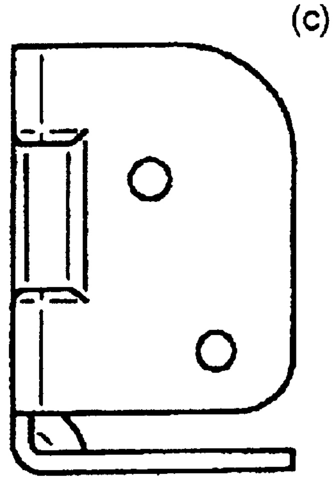
Figure 50:
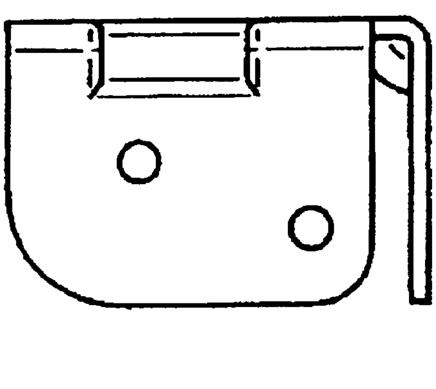

The inside of the corner is partially cut away as shown in FIG. 44 to cause rivets 21 to mount a base connection metal fittings D20. The base connection metal fittings D20 itself is shaped as shown in FIG. 50. A surface D22 of the base connection metal fittings D20 is formed with a base connection bolt insertion hole D23, through which a bolt for securement of the frames to a base or for suspending of a cabinet is inserted.

In the above-mentioned embodiment, fasteners are used for joining of the recesses D5, which are disposed on the outside of the frames to serve as draining portions. Although the projections D4, D4 on both sides of the oblique side D3 defining a bottom surface of the recess D5 interfere to make it hard for a sander to enter into a portion around the oblique side D3, fasteners are used for joining to make the assembling work favorable and improve the appearance. Besides, since other portions including the side walls are joined by welding, it is possible to achieve strength and a waterproof property.

In addition, the oblique side D3 of the recess D5 serving as a draining portion is not welded but a practically adequate, simple waterproof property can be achieved by firm securement with rivets or the like and insertion of packings can further improve the waterproof property. Also, at the time of assembly, temporary securement is first performed with fasteners, and then welding is carried out for improvement in workability. Besides, portions being welded are decreased to enable reducing the manufacturing cost.

Figure 51:
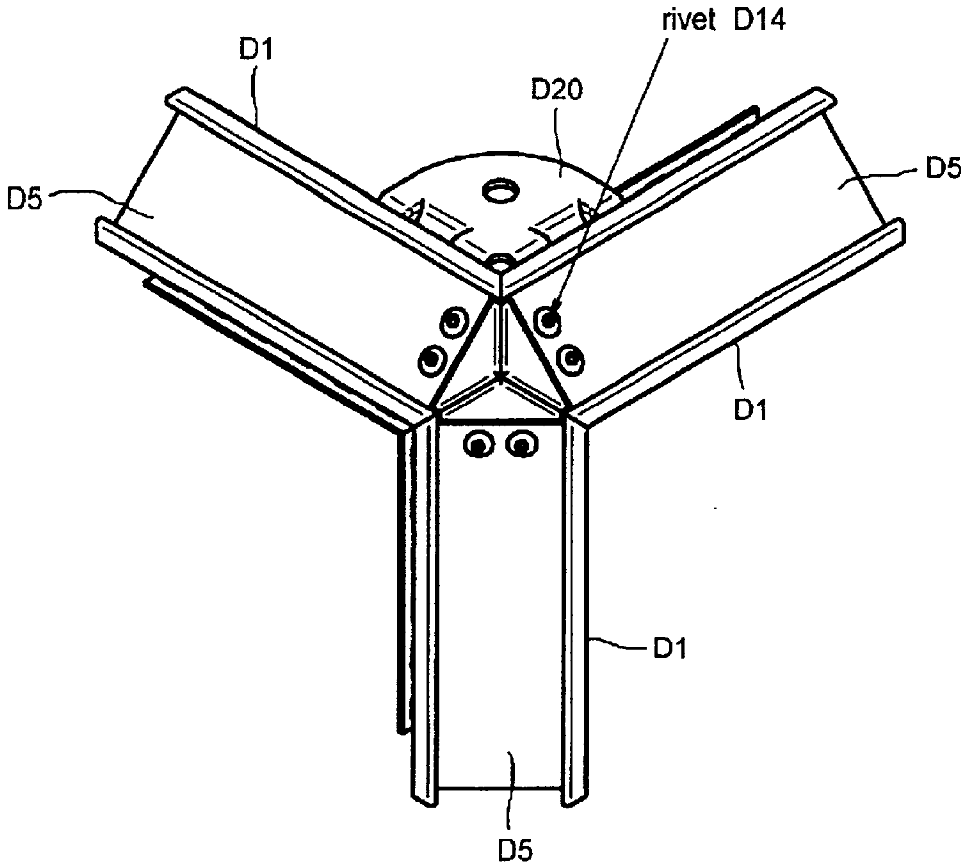
FIG. 51 is a perspective view showing a corner portion of the second embodiment as viewed from outside a cabinet.
Figure 52:
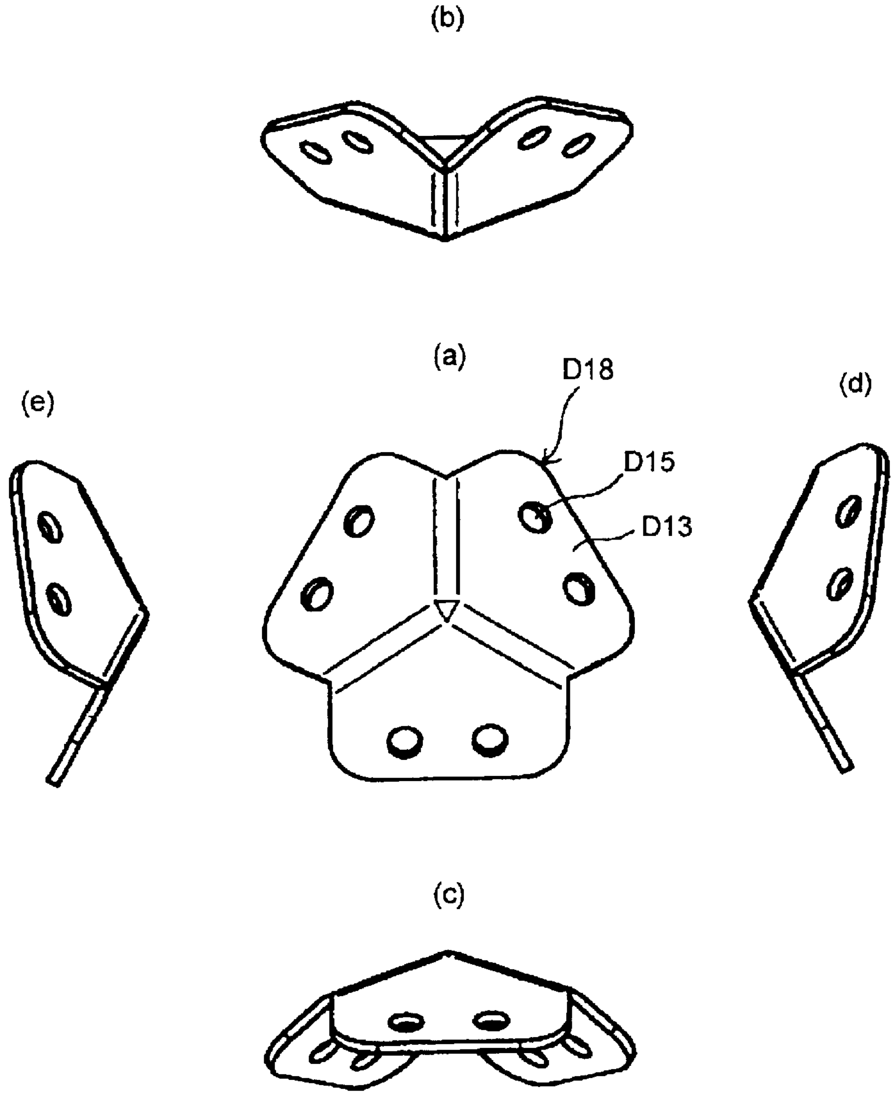
FIG. 52 is a view showing a corner piece of the second embodiment, (*a*) being a front view, (*b*) being a plan view, (*c*) being a bottom view, (*d*) being a right-side view, and (*e*) being a left-side view.

FIG. 51 shows a second embodiment, which is different from the first embodiment only in the use of a centrally pointed, tetrahedron-shaped corner piece D18. The remaining constitution of the second embodiment is the same as that of the first embodiment.

Figure 53:
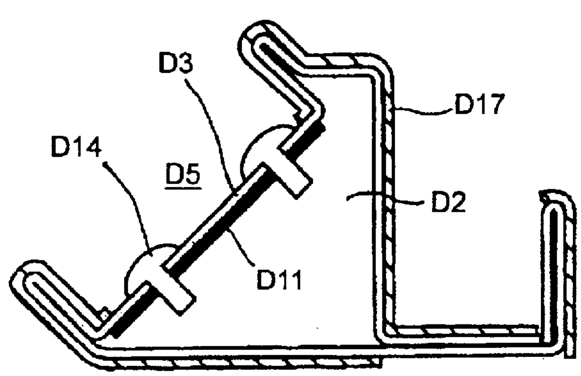
FIG. 53 is a cross sectional view showing a frame according to a third embodiment.

FIG. 53 ff show different embodiments, in which a frame 1 is varied in cross sectional shape.

Figure 54:
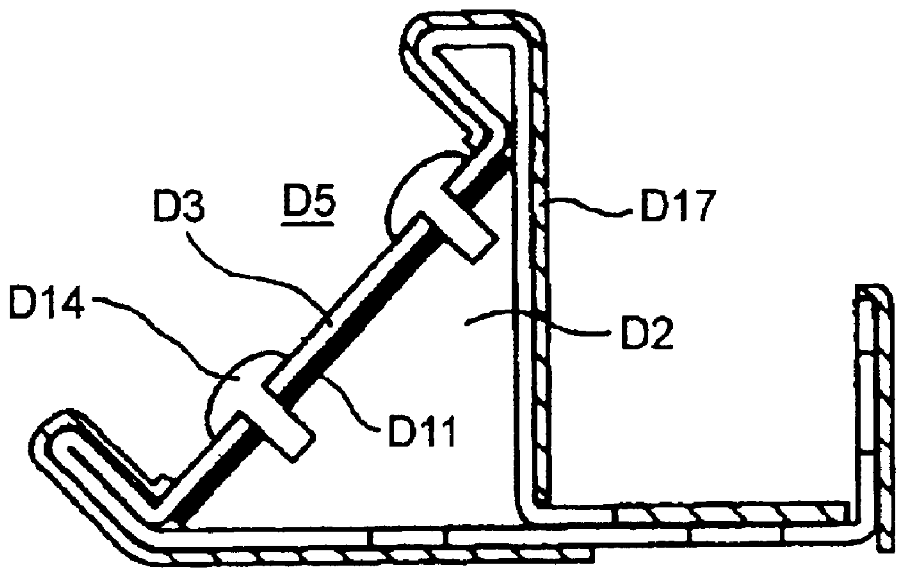
FIG. 54 is a cross sectional view showing a frame according to a fourth embodiment.

FIGS. 53 and 54 show third and fourth embodiments, in which the frame of the first embodiment shown in FIGS. 45 and 49 is slightly changed in cross sectional shape, and an oblique side D3 inside a recess D5 is joined by rivets D14 through a corner piece D11, other portions indicated by hatching being joined by welding.

A rivet referred to herein is a short metal rivet with a head at one end thereof, and inserted through a hole, which is formed through parts being joined and overlapped on one another, to be joined by striking and collapsing a non-headed end of the rivet with a press or a hammer. It is to be understood that the rivets D14 shown in the respective figures are a conceptual example of common ones.

In order to collapse the non-headed end of the rivet, it is necessary to perform the collapsing work from a back side of parts being joined, with a press or a hammer. However, there are rivets, which can be employed in the embodiments of the invention and dispense with the work from the back side, and so such rivets may be made use of.

Figure 64:
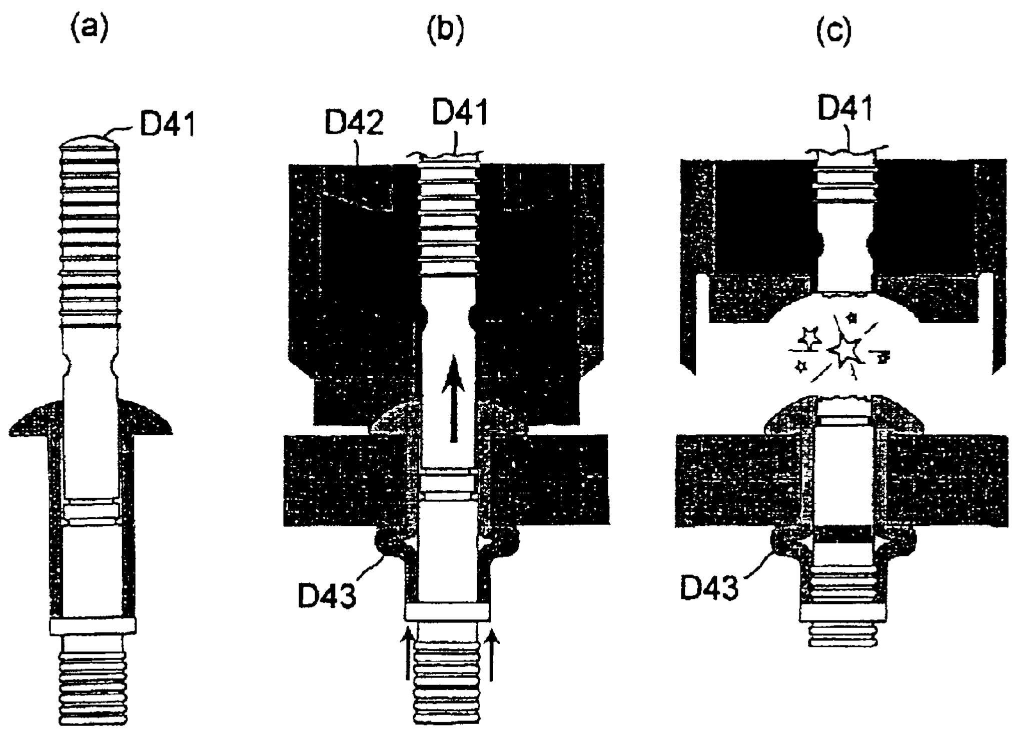
FIG. 64 is a view showing a cold punched rivet as an example of rivets, (*a*) showing a rivet, (*b*) showing a state, in which the rivet is mounted in a fastening tool and a lower end of the rivet begins to buckle, and (*c*) showing a state, in which buckling terminates and an upper end of the rivet is cut.

As an example, "cold punched rivet" is introduced with reference to FIG. 64. FIG. 64(*a*) shows a so-called cold punched rivet composed of a rivet body D40 and a rivet mandrel D41, and called "Bulbing Fastener" (registered trade mark). The rivet shown in (a) is mounted in a fastening tool D42 as shown in (b) to have a tip end thereof inserted into a target hole. The rivet mandrel D41 is pulled out so that a lower end D43 of the rivet body D40 buckles to be fastened in the same manner as in collapsing. As pulling-out continues, the rivet mandrel D41 is broken as shown in (c) for completion of the fastening work.

Figure 55:
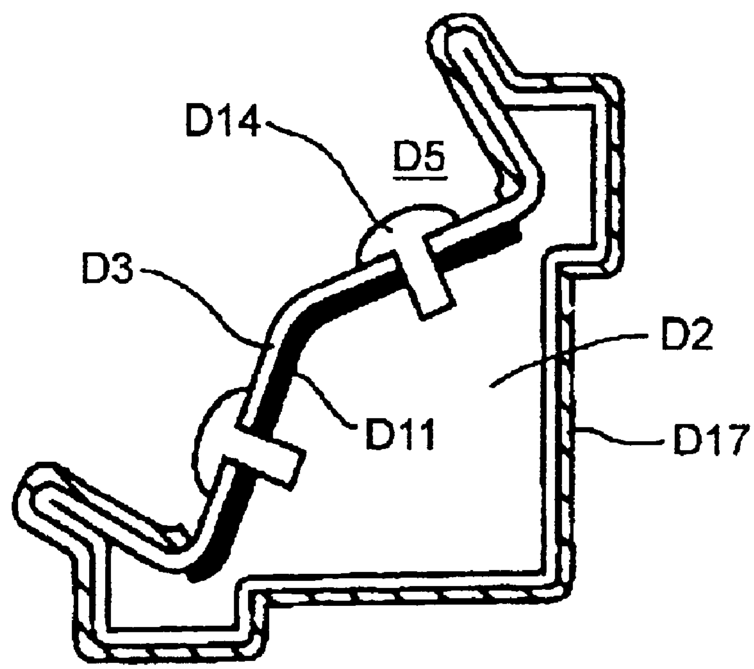
FIG. 55 is a cross sectional view showing a frame according to a fifth embodiment.

In a fifth embodiment shown in FIG. 55, an oblique side D3 is mountain-shaped, and the extension side D6 and the the right-angled folded side D7 in the first embodiment are omitted. Thus in the case of the oblique side D3 being mountain-shaped, a simple waterproof structure can be obtained by firm securement with the rivets D14.

Figure 56:
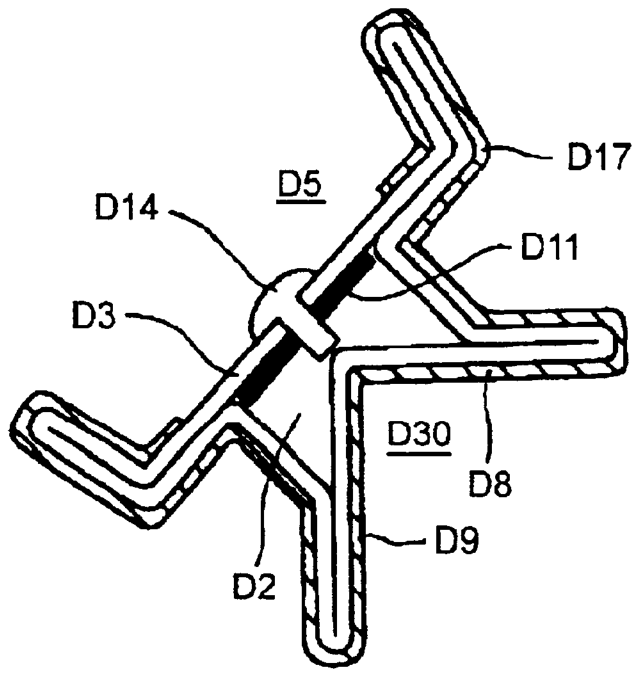
FIG. 56 is a cross sectional view showing a frame according to a sixth embodiment.
Figure 57:
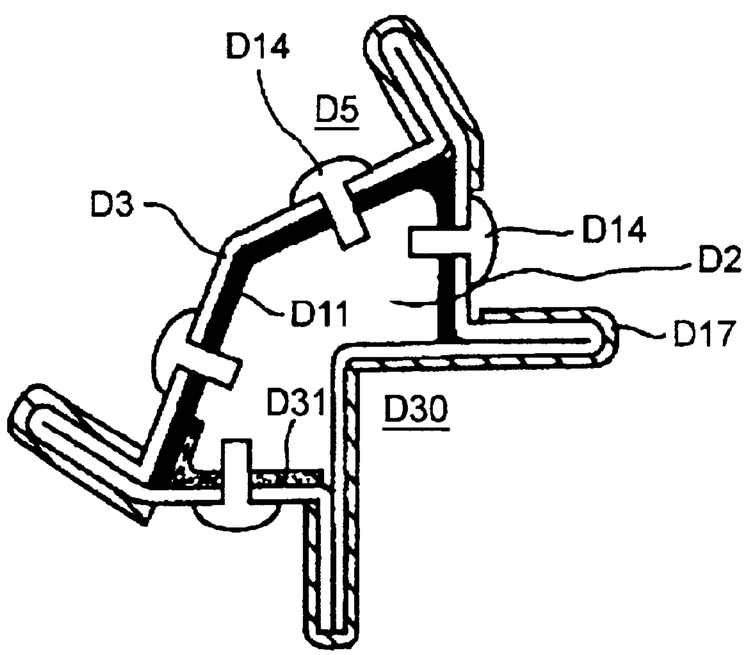
FIG. 57 is a cross sectional view showing a frame according to a seventh embodiment.
Figure 58:
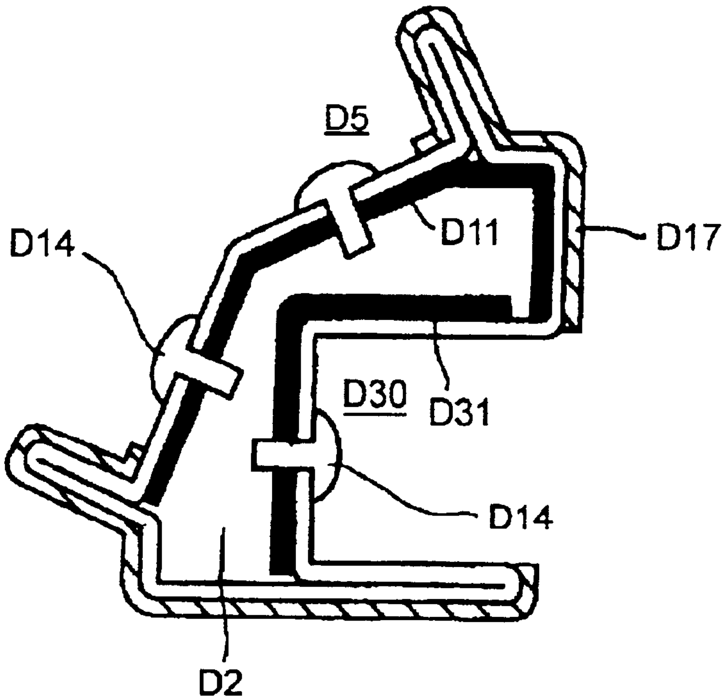
FIG. 58 is a cross sectional view showing a frame according to an eighth embodiment.
Figure 59:
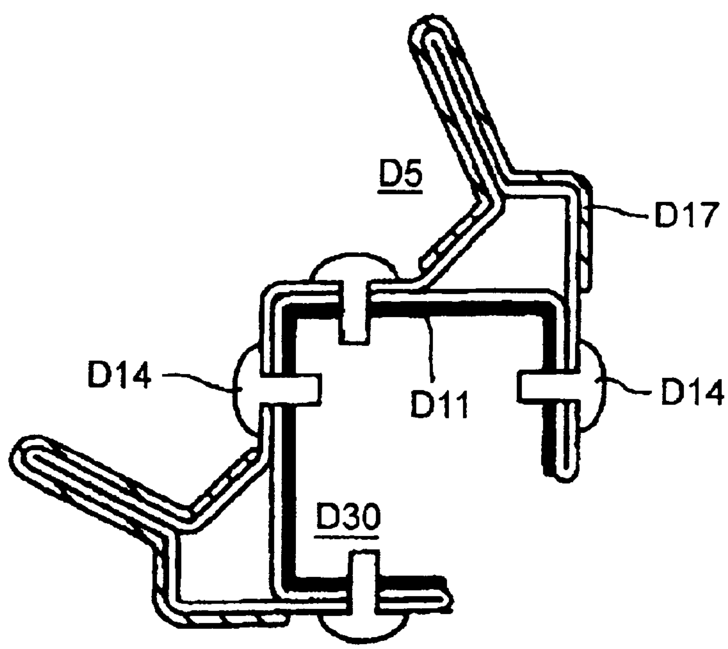
FIG. 59 is a cross sectional view showing a frame according to a ninth embodiment.
Figure 60:
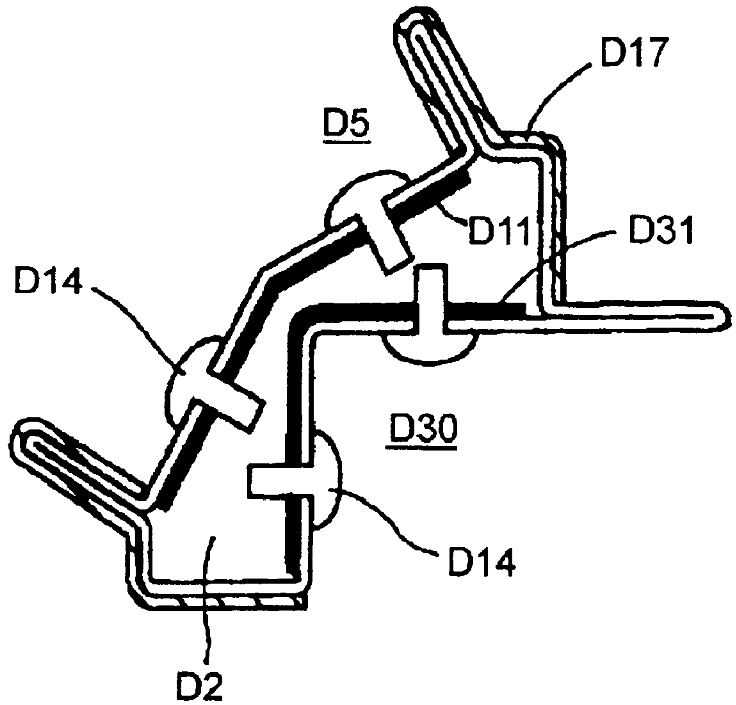
FIG. 60 is a cross sectional view showing a frame according to a tenth embodiment.

In a sixth embodiment shown in FIG. 56, the right-angled hollow portion D2 in the first embodiment is removed, orthogonal sides D8, D9 on a hollow portion D2 define an inwardly facing right-angled recess D30. However, this embodiment is identical to the first embodiment in that an oblique side D3 inside a recess D5 is joined by a rivet D14 and other portions indicated by hatching are welded.

In seventh to tenth embodiments shown in FIGS. 57 to 60, joining by means of rivets D14 is applied to a recess D30 further inwardly of the frame than portions abutting against a door, side panels, a roof D40, or the like. As described above, since a sander cannot enter into a recess D5 and the recess D30, to which welding is inappropriate, joining by means of fasteners is applied to the recess D5 and the recess D30. These embodiments are identical to the previous embodiments in that other portions indicated by hatching are welded. In addition, two corner pieces D11, D31 are used in these embodiments except one shown in FIG. 59.

Figure 61:
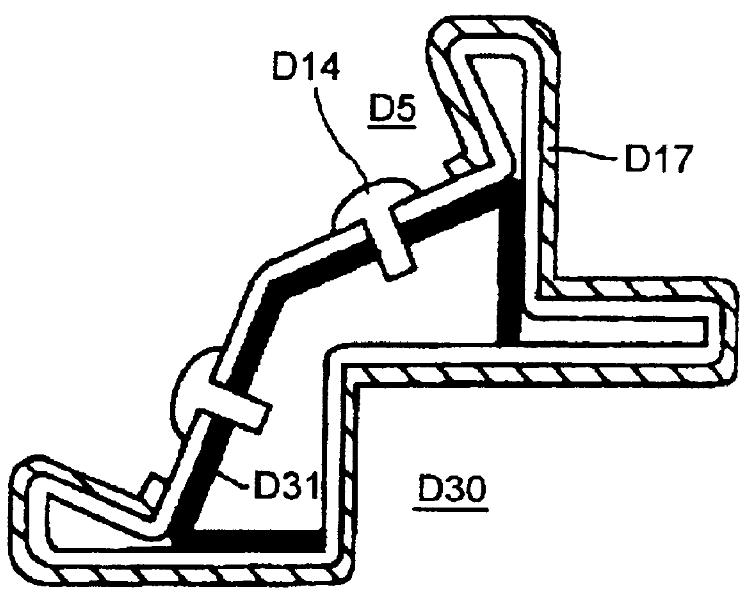
FIG. 61 is a cross sectional view showing a frame according to an eleventh embodiment.
Figure 62:
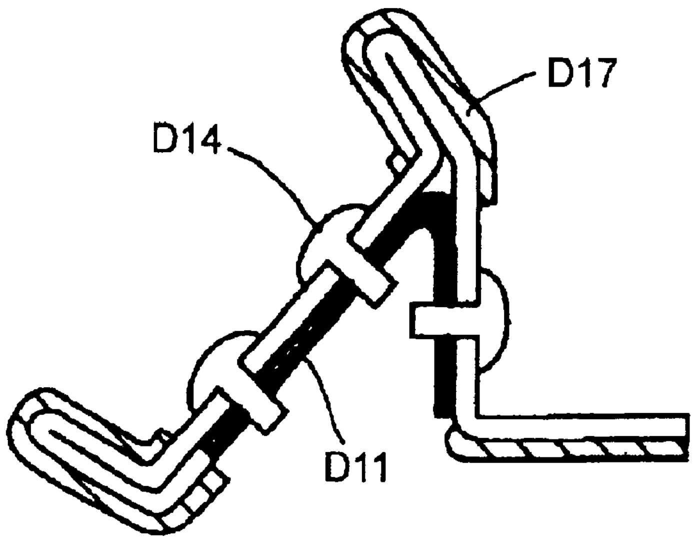
FIG. 62 is a cross sectional view showing a frame according to a twelfth embodiment.

In an eleventh embodiment shown in FIG. 61, a complexly bent corner piece D31 is used, and this embodiment is different from those shown in FIGS. 57 to 60 in that joining by means of rivets is applied to only a recess D5 on a frame outer side. In a twelfth embodiment shown in FIG. 62, a frame without the recess D2 is used.

Figure 63:
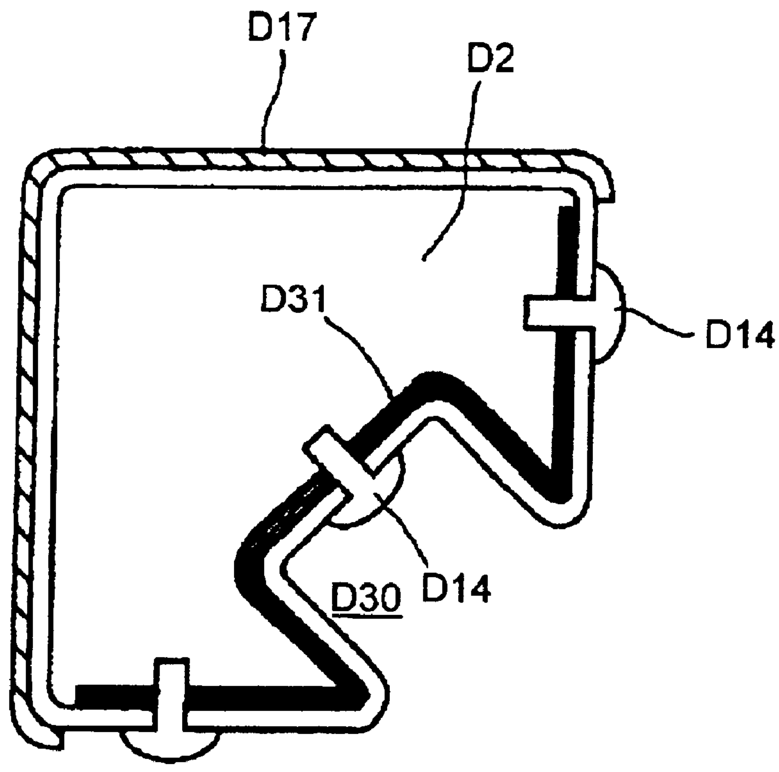
FIG. 63 is a cross sectional view showing a frame according to a thirteenth embodiment.

In a thirteenth embodiment shown in FIG. 63, a hollow frame is used, in which a recess D30 is formed only on a frame inner side. And joining by means of rivets D14 is applied to the frame inner side portion through a complexly bent corner piece D31. This embodiment is different from the other embodiments in that a frame outer side portion is composed of flat planes and welding is applied to the frame outer side portion.

Such formation of the recess D30 on the frame inner side portion can achieve an increase in strength of the frame and makes it possible for equipment mount rails to be received in the recess D30.

EFFECTS OF THE INVENTION (1) Effects of the Embodiment Form (A)

There is produced an advantage that an end configuration of the frame is simplified to dispense with complex cutting and a frame joining structure can be obtained which has an excellent strength and waterproof property.

(2) Effects of the Embodiment Form (B)

In the frame of this cabinet, the plate-shaped equipment mount sides project from the hollow portion, an adequate strength can be ensured by the hollow portion.

Also, the plate-shaped, orthogonal equipment mount sides are provided, so that it is possible to enter bolts from an open side thereof and to perform mounting of equipments in two directions without the use of special nuts.

Also, spacing between the base mental fittings being mounted on the corner portions can be made large, so that the cabinet is made excellent in earthquake performance.

Draining portions are provided on both sicies of a hollow portion, which is triangular in cross section, to abut obliquely against the outer wall of a cabinet, so that packings are included in the portions to enable providing for sealing of the draining portions between them and outer walls of a cabinet such as a door, aide plates and the like.

The plate-shaped equipment mount sides are formed with equipment mount holes, inside of which is circular and outside of which is quadrilateral, to thereby make mounting of equipments easy with the use of square neck bolts. In addition, a formed side is provided to be contiquons to a draining portion and parallel to the cabinet outer wall such that connection of cabinets is made easy.

(3) Effects of the embodiment form (C)

A vertical frame is provided with draining sides, which abut obliquely against the outer walls, so that contact pressure can be made small to advantageously provide a sure waterproof sealing with forces of a small magnitude and ensure water holding portions. And formed sides are provided to be disposed further inward than the draining sides and in parallel to the outer walls, whereby mounting of connection metal fittings and outer walls is advantageously made easy. An oblique side is provided to distend outward, thereby giving an advantage that strength can be enhanced and interference is hard to generate when bolts or he like are mounted on the frame body.

(4) Effects of the embodiment form (D)

Ends of frames are joined together by means of welding and fasteners, whereby locations of welding can be reduced while preserving strength, the assembling workability is improved, and cost reduction can be achieved.

Also, the the frame outer side portion is joined by welding, so that the waterproof property can be enhanced.

The recessed portion of the frame, into which a sander for treatment after welding is hard to enter, is secured by rivets, so that workability is improved. And enhancement of strength can be made compatible with reduction of welds by the use of a frame, in which recessed portions are formed in a frame inner side portion and a frame outer side portion, respectively.

The recessed portion formed on the frame outer side portion serves as a draining portion and is secured at a bottom portion thereof by a rivet or rivets and welded at side walls thereof, so that workability and waterproofness can be made compatibe, with each other.

What is claimed is:

1. A frame for electrical and electronic equipment housing cabinets, said frame comprising:

a plurality of frame segments arranged such that three mutually orthogonal frame segments are joined at a corner portion of the frame, wherein each of the three frame segments is cut along two planes at an end thereof, each of said two planes being at an angle of ±45° relative to a plane defined by the other two frames;

a corner member which is separate from the three frame segments, and which is provided at the corner portion to join the three frame segments, wherein the corner member comprises a trigonal pyramid shape which is exposed to outside of the frame and which has faces extending from outer side surfaces of the three frame segments; and obliquely extending draining portions provided on both sides of each of the outer side surfaces of the three frame segments, wherein corresponding ones of the draining portions are joined together at the corner portion.

2. A frame for electrical and electronic equipment housing cabinets, said frame comprising:

a plurality of frame segments arranged such that three mutually orthogonal frame segments are joined at a corner portion of the frame by fasteners and by welding;

wherein at least respective inner portions of the joined frame segments are joined at the corner portion by welding, and at least respective outer portions of the joined frame segments are joined at the corner portion by the fasteners;

wherein each frame segment has a cross-sectional shape including an interior hollow portion and an exterior recessed portion; and wherein the recessed portion of each said frame segment comprises a draining portion thereof, and the recessed portion of said each frame segment is secured at the corner portion by welding at an end of the recessed portion and by rivets at side walls of the recessed portion.

* * * * *